US012096510B2

(12) United States Patent
Sun

(10) Patent No.: US 12,096,510 B2
(45) Date of Patent: Sep. 17, 2024

(54) SESSION ESTABLISHMENT METHOD AND SYSTEM, AND DEVICE

(71) Applicant: HUAWEI TECHNOLOGIES CO., LTD., Guangdong (CN)

(72) Inventor: Dekui Sun, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/864,460

(22) Filed: Jul. 14, 2022

(65) Prior Publication Data
US 2022/0346183 A1 Oct. 27, 2022

Related U.S. Application Data

(63) Continuation of application No. 16/861,662, filed on Apr. 29, 2020, now Pat. No. 11,445,569, which is a (Continued)

(30) Foreign Application Priority Data

Oct. 30, 2017 (CN) .......................... 201711052952.8

(51) Int. Cl.
H04W 76/40 (2018.01)
H04W 8/06 (2009.01)
H04W 8/18 (2009.01)

(52) U.S. Cl.
CPC ............ *H04W 76/40* (2018.02); *H04W 8/06* (2013.01); *H04W 8/186* (2013.01)

(58) Field of Classification Search
CPC ....... H04W 76/40; H04W 8/06; H04W 8/186; H04W 48/18; H04W 4/08; H04L 29/08
See application file for complete search history.

(56) References Cited

U.S. PATENT DOCUMENTS 9,813,456 B2 11/2017 Gu et al.
10,798,618 B2 10/2020 Kim et al.
(Continued)

FOREIGN PATENT DOCUMENTS

CN 102711054 A 10/2012
CN 103167421 A 6/2013
(Continued)

OTHER PUBLICATIONS

3GPP TS 22.186 V15.2.0 (Sep. 2017), 3rd Generation Partnership Project; Technical Specification Group Services and System Aspects; Enhancement of 3GPP support for V2X scenarios; Stage 1(Release 15), total 16 pages.
(Continued)

Primary Examiner — Ayaz R Sheikh
Assistant Examiner — Tarell A Hampton

(57) ABSTRACT

Embodiments of the present disclosure provide a session establishment method and system, and a device, to meet a low-latency requirement of group communication. The method includes: obtaining, by a mobility management entity, group identification information of a group to which a terminal belongs; determining, by the mobility management entity based on the group identification information, a session management entity that serves the group to which the terminal belongs; and sending, by the mobility management entity, the group identification information to the session management entity, where the group identification information is used to determine a user plane function entity that serves the group to which the terminal belongs.

8 Claims, 11 Drawing Sheets

Related U.S. Application Data continuation of application No. PCT/CN2018/110595, filed on Oct. 17, 2018.

(56) References Cited

U.S. PATENT DOCUMENTS

| | | |
|---|---|---|
| 2012/0155391 A1 | 6/2012 | Kim et al. |
| 2013/0021970 A1 | 1/2013 | Lei |
| 2014/0269632 A1 | 9/2014 | Blankenship et al. |
| 2015/0229677 A1 | 8/2015 | Gu et al. |
| 2018/0192471 A1 | 7/2018 | Li et al. |
| 2018/0199398 A1 | 7/2018 | Dao et al. |
| 2018/0227873 A1 | 8/2018 | Vrzic et al. |
| 2018/0270778 A1* | 9/2018 | Bharatia .......... H04L 65/80 |
| 2018/0376446 A1 | 12/2018 | Youn et al. |
| 2019/0028866 A1 | 1/2019 | Baek et al. |
| 2019/0037636 A1 | 1/2019 | Kim et al. |
| 2019/0044980 A1 | 2/2019 | Russell et al. |
| 2019/0158408 A1 | 5/2019 | Li et al. |
| 2019/0158985 A1 | 5/2019 | Dao et al. |
| 2019/0166467 A1 | 5/2019 | Livanos et al. |
| 2019/0191467 A1 | 6/2019 | Dao et al. |
| 2019/0223250 A1 | 7/2019 | Dao et al. |
| 2019/0274072 A1 | 9/2019 | Prasda et al. |
| 2019/0387401 A1 | 12/2019 | Liao et al. |
| 2020/0007593 A1 | 1/2020 | Gu et al. |
| 2020/0045753 A1 | 2/2020 | Dao et al. |
| 2020/0053636 A1* | 2/2020 | Mas Rosique ........ H04W 48/18 |
| 2020/0059761 A1 | 2/2020 | Li et al. |
| 2020/0221540 A1 | 7/2020 | Sun et al. |
| 2020/0260523 A1 | 8/2020 | Sun |
| 2020/0305211 A1 | 9/2020 | Foti et al. |
| 2020/0344306 A1* | 10/2020 | Kahn ................ H04L 41/0893 |
| 2020/0367297 A1 | 11/2020 | Dao et al. |
| 2021/0099843 A1 | 4/2021 | Yang et al. |
| 2021/0168584 A1 | 6/2021 | Li et al. |
| 2021/0204336 A1 | 7/2021 | Xu et al. |
| 2021/0219116 A1 | 7/2021 | Perras et al. |
| 2021/0274323 A1 | 9/2021 | Xu et al. |
| 2021/0274571 A1 | 9/2021 | Kawasaki et al. |
| 2021/0329725 A1 | 10/2021 | Kawasaki et al. |
| 2021/0345113 A1 | 11/2021 | Parron et al. |

FOREIGN PATENT DOCUMENTS

| | | |
|---|---|---|
| CN | 103491511 A | 1/2014 |
| CN | 103609147 A | 2/2014 |
| CN | 102714838 B | 6/2014 |
| CN | 104618349 A | 5/2015 |
| CN | 105163285 A | 12/2015 |
| CN | 104170416 B | 1/2018 |
| WO | 2011137783 A1 | 11/2011 |
| WO | 2017126892 A1 | 7/2017 |

OTHER PUBLICATIONS

Partial Supplementary European Search Report issued in EP Application No. 18873482.6, dated Jul. 3, 2020, total 11 pages.

Notice of Allowance issued in CN 201711052952.8, dated Mar. 31, 2021, total 4 pages.

LG Electronics, "TS 23.502: DN authorization and PDU session anchor relocation", SA WG2 Meeting #122 S2-174591, May 26-30, 2017, San Jose Del Cabo, Mexico, Total 11 Pages.

Office Action issued in CN202110656725.6, dated Feb. 22, 2022, 7 pages.

Indian Office Action issued in IN202047019139, dated Nov. 8, 2021, 10 pages.

3GPP TS 23.502 V1.1.0 (Sep. 2017), 3rd Generation Partnership Project; Technical Specification Group Services and System Aspects; Procedures for the 5G System; Stage 2 (Release 15), total 167 pages.

Office Action issued in EP18873482.6, dated Feb. 22, 2022, 6 pages.

3GPP, "System architecture for the 5G System (5GS) (Release 15)," 3rd Generation Partnership Project (3GPP), Technical Specification (TS) TS 23.501, Sep. 2017, version 1.3.0. (Year: 2017).

3GPP, "Procedures fo the 5G System (Release 15)," 3rd Generation Partnership Project (3GPP), Technical Specification (TS) TS 23.502, Sep. 2017, version 1.2.0. (Year: 2017).

Extended European Search Report issued in European Application No. 18873482.6 dated Sep. 18, 2020, total 11 pages.

Notice of Allowance issued in CN202110656725.6, dated Aug. 3, 2022, 4 pages.

\* cited by examiner

SESSION ESTABLISHMENT METHOD AND SYSTEM, AND DEVICE

CROSS-REFERENCE TO RELATED APPLICATIONS

This application is a continuation of U.S. patent application Ser. No. 16/861,662, filed on Apr. 29, 2020, which is a continuation of International Application No. PCT/CN2018/110595, filed on Oct. 17, 2018, which claims priority to Chinese Patent Application No. 201711052952.8, filed on Oct. 30, 2017. All of the afore-mentioned patent applications are hereby incorporated by reference in their entireties.

TECHNICAL FIELD

Example embodiments relate to the field of communications technologies, and in particular, to a session establishment method and system, and a device.

BACKGROUND

With the development of mobile communications technologies, internet of things (IoT) marked by "internet of everything" has initiated a new round of industrial revolution. As an extension of the internet of things technology in the field of intelligent transportation systems, internet of vehicles uses technologies such as wireless communication and sensor detection to collect information such as vehicles, roads, and environments, and implements an integrated network of intelligent transportation management and control, intelligent vehicle control, and intelligent dynamic information service through vehicle-to-vehicle (V2V) communication and vehicle-to-infrastructure (V2I) communication. In recent years, the market of the internet of vehicles has been growing explosively and has great potential.

The 5th generation (5G) technical specification (TS) 22186 summarizes application requirements for and scenarios of the internet of vehicles. There are four main scenarios: a platooning service, a remote driving service, a sensor data sharing service scenario, and an automatic driving service scenario. The platooning service is currently a most valued service. In a platooning service scenario, a specific quantity of vehicles forms a platoon travelling on a road. Similar to a train, a leading vehicle (the first vehicle) is responsible for management of the entire platoon, distribution of driving information, and communication between the platoon and the outside (for example, an application server). In a high-speed driving process, a shortest distance between vehicles in the platoon may be approximately 1 m. Therefore, a typical advantage of platooning is that road utilization can be greatly improved, and congestion can be alleviated. Because a distance between two vehicles in the platoon is quite small, a latency of the vehicle-to-vehicle communication is required to be small enough. Currently, TS 22186 requires that an end-to-end latency of vehicle-to-vehicle communication in a platoon is within 10 ms. In addition, another typical feature of platooning is that a length of a platoon cannot be excessively long. Currently, the 3rd generation partnership project (3GPP) requires that a quantity of vehicles does not exceed 19. In a case of an extremely long truck, the quantity may be smaller. This means that a maximum length of the platoon is approximately 300 m.

In the existing techniques, when selecting a user plane resource for a vehicle in a platoon, a network side does not consider a feature of group communication such as platooning. As a result, although vehicles in a platoon are close to each other, the network side still selects different user plane function (UPF) entities for the vehicles. Consequently, data forwarding between different UPF entities corresponding to the vehicles needs to be performed for vehicle-to-vehicle communication, and a low-latency requirement of group communication cannot be met.

SUMMARY

Embodiments of this application provide a session establishment method and system, and a device, to meet a low-latency requirement of group communication.

To achieve the foregoing objective, the embodiments of this application provide the following technical solutions:

According to a first aspect, a session establishment method is provided, where the method includes: obtaining, by a mobility management entity, group identification information of a group to which a terminal belongs; determining, by the mobility management entity based on the group identification information, a session management entity that serves the group to which the terminal belongs; and sending, by the mobility management entity, the group identification information to the session management entity, where the group identification information is used to determine a user plane function entity that serves the group to which the terminal belongs. Based on the session establishment method provided in this embodiment of this application, after determining, based on the group identification information, the session management entity that serves the group to which the terminal belongs, the mobility management entity may send the group identification information to the session management entity, and the session management entity determines, based on the group identification information, the user plane function entity that serves the group to which the terminal belongs. In other words, for terminals in group communication, a network side selects a same user plane function entity for the terminals in the group based on the group identification information, so that during communication between the terminals in the group, forwarding data between different user plane function entities corresponding to the terminals is not needed. Therefore, a low-latency requirement of group communication can be met.

In a possible implementation, the determining, by the mobility management entity based on the group identification information, a session management entity that serves the group to which the terminal belongs includes: sending, by the mobility management entity, a session management entity request message to a database entity, where the session management entity request message is used to request information about the session management entity that serves the group to which the terminal belongs; and receiving, by the mobility management entity, a session management entity response message from the database entity, where the session management entity response message carries the information about the session management entity that serves the group to which the terminal belongs. In other words, the information about the session management entity that serves the group to which the terminal belongs may be prestored in the database entity.

In a possible implementation, the determining, by the mobility management entity based on the group identification information, a session management entity that serves the group to which the terminal belongs includes: sending, by the mobility management entity, the session management entity request message to the database entity, where the session management entity request message is used to request the information about the session management entity that serves the group to which the terminal belongs; receiving, by the mobility management entity, the session management entity response message from the database entity, where the session management entity response message is used to indicate that there is no information about the session management entity that serves the group to which the terminal belongs; and determining, by the mobility management entity, the session management entity that serves the group to which the terminal belongs. In other words, when there is no information about the session management entity that serves the group to which the terminal belongs in the database entity, the mobility management entity may select the session management entity that serves the group to which the terminal belongs.

In a possible implementation, after the determining, by the mobility management entity, the session management entity that serves the group to which the terminal belongs, the method further includes: sending, by the mobility management entity, a notification message to the database entity, where the notification message is used to instruct the database entity to store a correspondence between the group identification information and the information about the session management entity. In this way, when a mobility management entity that serves another terminal in the group subsequently determines a session management entity that serves a group to which the terminal belongs, the mobility management entity may obtain, from the database entity, information about the session management entity that serves the group to which the terminal belongs.

In a possible implementation, after the determining, by the mobility management entity, the session management entity that serves the group to which the terminal belongs, the method further includes: storing, by the mobility management entity, the information about the session management entity into a context of the terminal. In this way, when subsequently determining the session management entity that serves the group, the mobility management entity may determine, from the context of the terminal in the mobility management entity, the information about the session management entity that serves the group.

In a possible implementation, the determining, by the mobility management entity based on the group identification information, a session management entity that serves the group to which the terminal belongs includes: determining, by the mobility management entity based on the group identification information and the context of the terminal, the session management entity that serves the group to which the terminal belongs, where the context of the terminal includes the information about the session management entity that serves the group to which the terminal belongs. In other words, the information about the session management entity that serves the group to which the terminal belongs may be prestored into the context of the terminal in the mobility management entity.

In a possible implementation, the obtaining, by a mobility management entity, group identification information of a group to which a terminal belongs includes: obtaining, by the mobility management entity, the context of the terminal, where the context of the terminal includes the group identification information of the group to which the terminal belongs. In other words, the group identification information of the group to which the terminal belongs may be prestored into the context of the terminal in the mobility management entity.

In a possible implementation, before the obtaining, by the mobility management entity, the context of the terminal, the method further includes: receiving, by the mobility management entity, a registration request from the terminal, where the registration request carries an identity of the terminal; obtaining, by the mobility management entity, subscription data of the terminal from the database entity based on the identity of the terminal, where the subscription data includes the group identification information of the group to which the terminal belongs; and storing, by the mobility management entity, the group identification information of the group to which the terminal belongs into the context of the terminal.

In a possible implementation, before the obtaining, by the mobility management entity, the context of the terminal, the method further includes: receiving, by the mobility management entity, the group identification information of the group to which the terminal belongs from the database entity; and storing, by the mobility management entity, the group identification information of the group to which the terminal belongs into the context of the terminal.

In a possible implementation, the obtaining, by a mobility management entity, group identification information of a group to which a terminal belongs includes: receiving, by the mobility management entity, the group identification information of the group to which the terminal belongs from the database entity. In other words, the group identification information of the group to which the terminal belongs may be obtained from the database entity side.

In a possible implementation, the obtaining, by a mobility management entity, group identification information of a group to which a terminal belongs includes: receiving, by the mobility management entity, a session establishment request from the terminal, where the session establishment request carries the group identification information of the group to which the terminal belongs. In other words, the group identification information of the group to which the terminal belongs may be obtained from the terminal side.

According to a second aspect, a session establishment method is provided, where the method includes: receiving, by a session management entity, group identification information of a group to which a terminal belongs from a mobility management entity; determining, by the session management entity based on the group identification information, a user plane function entity that serves the group to which the terminal belongs; and sending, by the session management entity, path information to the user plane entity, where the path information is used to establish a user plane path of the terminal. Based on the session establishment method provided in this embodiment of this application, the session management entity may receive the group identification information from the mobility management entity, and determine, based on the group identification information, the user plane function entity that serves the group. In other words, for terminals in group communication, a network side selects a same user plane function entity for the terminals in the group based on the group identification information, so that during communication between the terminals in the group, forwarding data between different user plane function entities corresponding to the terminals is not needed. Therefore, a low-latency requirement of group communication can be met.

In a possible implementation, the determining, by the session management entity based on the group identification information, a user plane function entity that serves the group to which the terminal belongs includes: sending, by the session management entity, a user plane function entity request message to a database entity, where the user plane function entity request message is used to request information about the user plane function entity that serves the group to which the terminal belongs; and receiving, by the session management entity, a user plane function entity response message from the database entity, where the user plane function entity response message carries the information about the user plane function entity that serves the group to which the terminal belongs. In other words, the information about the user plane function entity that serves the group to which the terminal belongs may be prestored in the database entity.

In a possible implementation, the determining, by the session management entity based on the group identification information, a user plane function entity that serves the group to which the terminal belongs includes: sending, by the session management entity, a user plane function entity request message to a database entity, where the user plane function entity request message is used to request information about the user plane function entity that serves the group to which the terminal belongs; receiving, by the session management entity, a user plane function entity response message from the database entity, where the user plane function entity response message is used to indicate that there is no information about the user plane function entity that serves the group to which the terminal belongs; and determining, by the session management entity, the user plane function entity that serves the group to which the terminal belongs. In other words, when there is no information about the user plane function entity that serves the group to which the terminal belongs in the database entity, the session management entity may select the user plane function entity that serves the group to which the terminal belongs.

In a possible implementation, after the determining, by the session management entity, the user plane function entity that serves the group to which the terminal belongs, the method further includes: sending, by the session management entity, a notification message to the database entity, where the notification message is used to instruct the database entity to store a correspondence between the group identification information and the information about the user plane function entity. In this way, when subsequently determining the user plane function entity that serves the group, the session management entity may obtain, from the database entity, the information about the user plane function entity that serves the group.

In a possible implementation, the notification message is further used to instruct the database entity to store a correspondence between the group identification information and information about the session management entity. In this way, when subsequently determining the user plane function entity that serves the group to which the terminal belongs, the session management entity may obtain, from the database entity, the information about the user plane function entity that serves the group to which the terminal belongs.

In a possible implementation, after the determining, by the session management entity, the user plane function entity that serves the group to which the terminal belongs, the method further includes: storing, by the session management entity, the information about the user plane function entity into a context of the terminal. In this way, when subsequently determining the user plane function entity that serves the group, the session management entity may determine, from the context of the terminal in the session management entity, the information about the user plane function entity that serves the group to which the terminal belongs.

In a possible implementation, the determining, by the session management entity based on the group identification information, a user plane function entity that serves the group to which the terminal belongs includes: determining, by the session management entity based on the group identification information and the context of the terminal, the user plane function entity that serves the group to which the terminal belongs, where the context of the terminal includes the information about the user plane function entity that serves the group to which the terminal belongs. In other words, the information about the user plane function entity that serves the group to which the terminal belongs may be prestored into the context of the terminal in the session management entity.

According to a third aspect, a handover method is provided, where the method includes: receiving, by a session management entity, a handover request from a first access device, where the first access device is an access device currently accessed by a first terminal; obtaining, by the session management entity based on the handover request, terminal information in a group to which the first terminal belongs; determining, by the session management entity, a target user plane function entity that serves the group to which the first terminal belongs; and sending, by the session management entity, path information to the target user plane function entity, where the path information is used to establish a user plane path of a terminal in the group to which the first terminal belongs. Based on the handover method provided in this embodiment of this application, when a terminal in the group is handed over, terminals in the group to which the terminal belongs may be migrated in batches, to ensure that all the terminals in the group are served by a same user plane function entity, and throughout communication between the terminals in the group, forwarding data between different user plane function entities corresponding to the terminals is not needed. Therefore, a low-latency requirement of group communication can be met.

In a possible implementation, the obtaining, by the session management entity based on the handover request, terminal information in a group to which the first terminal belongs includes: obtaining, by the session management entity, a context of the first terminal based on the handover request, where the context of the first terminal includes group identification information of the group to which the first terminal belongs; and determining, by the session management entity based on the group identification information, the terminal information in the group to which the first terminal belongs.

In a possible implementation, the obtaining, by the session management entity based on the handover request, terminal information in a group to which the first terminal belongs includes: determining, by the session management entity based on the handover request, that the terminal information in the group to which the first terminal belongs needs to be obtained; sending, by the session management entity, an obtaining request to a database entity, where the obtaining request is used to request to obtain the terminal information in the group to which the first terminal belongs; and receiving, by the session management entity, the terminal information in the group to which the first terminal belongs from the database entity. In other words, the session management entity may obtain the terminal information in the group to which the first terminal belongs from the database entity.

In a possible implementation, the group to which the first terminal belongs includes a second terminal; the path information includes uplink path information of a second access device and first downlink path information of the target user plane function entity, the uplink path information of the second access device and the first downlink path information of the target user plane function entity are used to establish a user plane path between the second access device and the target user plane function entity, and the second access device is an access device currently accessed by the second terminal; and the method further includes: obtaining, by the session management entity, the uplink path information of the second access device.

In a possible implementation, the obtaining, by the session management entity, the uplink path information of the second access device includes: obtaining, by the session management entity, a context of the second terminal, where the context of the second terminal includes the uplink path information of the second access device. In other words, the session management entity may determine the uplink path information of the second access device from the context of the second terminal.

In a possible implementation, the obtaining, by the session management entity, the uplink path information of the second access device includes: receiving, by the session management entity, the uplink path information of the second access device from the second access device. In other words, the session management entity may obtain the uplink path information of the second access device from the second access device.

In a possible implementation, the method further includes: sending, by the session management entity, a notification message to the second access device, where the notification message is used to instruct the second access device to establish the user plane path between the second access device and the target user plane function entity.

According to a fourth aspect, a session establishment method is provided, where the method includes: obtaining, by a control device, information about a group, where the information about the group includes terminal information in the group; and sending, by the control device, a trigger message to a terminal in the group based on the information about the group, where the trigger message is used to trigger the terminal in the group to initiate a session establishment procedure. Based on the session establishment method provided in this embodiment of this application, the control device may trigger the terminal in the group to initiate the session establishment procedure.

In a possible implementation, the information about the group further includes group identification information of the group, the trigger message carries the group identification information, and the group identification information is used to establish a session for the terminal in the group. In other words, the group identification information of the group to which the terminal belongs may be provided for the terminal in the group.

In a possible implementation, the information about the group further includes the group identification information of the group, and the method further includes: sending, by the control device, the group identification information and the terminal information in the group to a database entity, where the group identification information is used to establish a session for the terminal in the group. In other words, the control device may push the group identification information and the terminal information in the group to the database entity.

In a possible implementation, the method further includes: sending, by the database entity, the group identification information of the group to a mobility management entity that serves the terminal in the group. In other words, the group identification information of the group to which the terminal belongs may be provided to the mobility management entity that serves the terminal in the group.

According to a fifth aspect, a session establishment method is provided, where the method includes: obtaining, by a mobility management entity, group identification information of a group to which a terminal belongs; determining, by the mobility management entity based on the group identification information, a session management entity that serves the group to which the terminal belongs; sending, by the mobility management entity, the group identification information to the session management entity; receiving, by the session management entity, the group identification information from the mobility management entity; determining, by the session management entity based on the group identification information, a user plane function entity that serves the group to which the terminal belongs; and sending, by the session management entity, path information to the user plane entity, where the path information is used to establish a user plane path of the terminal. Based on the session establishment method provided in this embodiment of this application, the session management entity may receive the group identification information from the mobility management entity, and determine, based on the group identification information, the user plane function entity that serves the group. In other words, for terminals in group communication, a network side selects a same user plane function entity for the terminals in the group based on the group identification information, so that during communication between the terminals in the group, forwarding data between different user plane function entities corresponding to the terminals is not needed. Therefore, a low-latency requirement of group communication can be met.

In a possible implementation, the method further includes: obtaining, by a control device, information about the group, where the information about the group includes terminal information in the group; and sending, by the control device, a trigger message to a terminal in the group based on the group information, where the trigger message is used to trigger the terminal in the group to initiate a session establishment procedure. Based on the session establishment method, the control device may trigger the terminal in the group to initiate the session establishment procedure.

In a possible implementation, the information about the group includes the group identification information of the group; and the method further includes: sending, by the control device, the group identification information and terminal information in the group to a database entity; and receiving, by the database entity, the group identification information and the terminal information in the group from the control device, where the group identification information is used to establish a session for the terminal in the group. Based on the session establishment method, the mobility management entity that can serve the terminal in the group may obtain the group identification information of the group to which the terminal belongs.

According to a sixth aspect, a handover method is provided, where the method includes: receiving, by a session management entity, a handover request from a first access device, where the first access device is an access device currently accessed by a first terminal; obtaining, by the session management entity based on the handover request, terminal information in a group to which the first terminal belongs; determining, by the session management entity, a target user plane function entity that serves the group to which the first terminal belongs; sending, by the session management entity, path information to the target user plane function entity; and receiving, by the target user plane function entity, the path information from the session management entity, where the path information is used to establish a user plane path of a terminal in the group to which the first terminal belongs. Based on the handover method provided in this embodiment of this application, when a terminal in the group is handed over, terminals in the group to which the terminal belongs may be migrated in batches, to ensure that all the terminals in the group are served by a same user plane function entity, and throughout communication between the terminals in the group, forwarding data between different user plane function entities corresponding to the terminals is not needed. Therefore, a low-latency requirement of group communication can be met.

According to a seventh aspect, a mobility management entity is provided. The mobility management entity has a function of implementing the method according to the first aspect. The function may be implemented by hardware, or may be implemented by hardware by executing corresponding software. The hardware or the software includes one or more modules corresponding to the foregoing function.

According to an eighth aspect, a mobility management entity is provided, including a processor and a memory. The memory is configured to store a computer-executable instruction. When the mobility management entity runs, the processor executes the computer-executable instruction stored in the memory, so that the mobility management entity performs the session establishment method according to any one of the possible implementations of the first aspect.

According to a ninth aspect, a computer readable storage medium is provided. The computer readable storage medium stores an instruction. When the instruction is run on a computer, the computer is enabled to perform the session establishment method according to any one of the possible implementations of the first aspect.

According to a tenth aspect, a computer program product including an instruction is provided. When the instruction is run on a computer, the computer is enabled to perform the session establishment method according to any one of the possible implementations of the first aspect.

According to an eleventh aspect, a chip system is provided. The chip system includes a processor, configured to support a mobility management entity in implementing the functions in the foregoing aspects, for example, obtaining group identification information of a group to which a terminal belongs. In a possible implementation, the chip system further includes a memory. The memory is configured to store a program instruction and data that are necessary for the mobility management entity. The chip system may include a chip, or may include a chip and another discrete device.

For technical effects brought by any implementations in the seventh aspect to the eleventh aspect, refer to technical effects brought by different implementations in the first aspect. Details are not described herein again.

According to a twelfth aspect, a session management entity is provided. The session management entity has a function of implementing the method according to the second aspect or the third aspect. The function may be implemented by hardware, or may be implemented by hardware by executing corresponding software. The hardware or the software includes one or more modules corresponding to the foregoing function.

According to a thirteenth aspect, a session management entity is provided, including a processor and a memory. The memory is configured to store one or more computer-executable instructions. When the session management entity runs, the processor executes the one or more computer-executable instructions stored in the memory, so that the session management entity performs the session establishment method according to any one of the possible implementations of the second aspect, or the session management entity performs the handover method according to any one of the possible implementations of the third aspect.

According to a fourteenth aspect, a computer readable storage medium is provided. The computer readable storage medium stores one or more instructions. When the one or more instructions are run on a computer, the computer is enabled to perform the session establishment method according to any one of the possible implementations of the second aspect, or the computer is enabled to perform the handover method according to any one of the possible implementations of the third aspect.

According to a fifteenth aspect, a computer program product including one or more instructions is provided. When the computer program product is run on a computer, the computer is enabled to perform the session establishment method according to any one of the possible implementations of the second aspect, or the computer is enabled to perform the handover method according to any one of the possible implementations of the third aspect.

According to a sixteenth aspect, a chip system is provided. The chip system includes a processor, configured to support a session management entity in implementing the functions in the foregoing aspects, for example, determining, based on group identification information, a user plane function entity that serves a group to which a terminal belongs. In a possible implementation, the chip system further includes a memory. The memory is configured to store one or more program instructions and data that are necessary for the session management entity. The chip system may include a chip, or may include a chip and another discrete device.

For technical effects brought by any implementation in the twelfth aspect to the sixteenth aspect, refer to technical effects brought by different implementations in the second aspect or the third aspect. Details are not described herein again.

According to a seventeenth aspect, a control device is provided. The control device has a function of implementing the method according to the fourth aspect. The function may be implemented by hardware, or may be implemented by hardware by executing corresponding software. The hardware or the software includes one or more modules corresponding to the foregoing function.

According to an eighteenth aspect, a control device is provided, including a processor and a memory. The memory is configured to store one or more computer-executable instructions. When the control device runs, the processor executes the one or more computer-executable instructions stored in the memory, so that the control device performs the session establishment method according to any one of the possible implementations of the fourth aspect.

According to a nineteenth aspect, a computer readable storage medium is provided. The computer readable storage medium stores one or more instructions. When the one or more instructions are run on a computer, the computer is enabled to perform the session establishment method according to any one of the possible implementations of the fourth aspect.

According to a twentieth aspect, a computer program product including one or more instructions is provided.

When the computer program product is run on a computer, the computer is enabled to perform the session establishment method according to any one of the possible implementations of the fourth aspect.

According to a twenty-first aspect, a chip system is provided. The chip system includes a processor, configured to support a control device in implementing the functions in the foregoing aspects, for example, obtaining information about a group. In a possible implementation, the chip system further includes a memory. The memory is configured to store one or more program instructions and data that are necessary for the control device. The chip system may include a chip, or may include a chip and another discrete device.

For technical effects brought by any implementations in the seventeenth aspect to the twenty-first aspect, refer to technical effects brought by different implementations in the first aspect. Details are not described herein again.

According to a twenty-second aspect, a session establishment system is provided, where the session establishment system includes a mobility management entity and a session management entity. The mobility management entity is configured to obtain group identification information of a group to which a terminal belongs. The mobility management entity is further configured to determine, based on the group identification information, a session management entity that serves the group to which the terminal belongs. The mobility management entity is further configured to send the group identification information to the session management entity. The session management entity is configured to receive the group identification information from the mobility management entity. The session management entity is further configured to determine, based on the group identification information, a user plane function entity that serves the group to which the terminal belongs. The session management entity is further configured to send path information to the user plane entity, where the path information is used to establish a user plane path of the terminal. For technical effects brought by the twenty-second aspect, refer to the technical effect brought by the fifth aspect. Details are not described herein again.

According to a twenty-third aspect, a handover system is provided, where the handover system includes a session management entity and a target user plane function entity. The session management entity is configured to receive a handover request from a first access device, where the first access device is an access device currently accessed by a first terminal. The session management entity is further configured to obtain, based on the handover request, terminal information in a group to which the first terminal belongs. The session management entity is further configured to determine a target user plane function entity that serves the group to which the first terminal belongs. The session management entity is further configured to send path information to the target user plane function entity. The target user plane function entity is configured to receive the path information from the session management entity, where the path information is used to establish a user plane path of a terminal in the group to which the first terminal belongs. For technical effects brought by the twenty-third aspect, refer to the technical effect brought by the sixth aspect. Details are not described herein again.

According to a twenty-fourth aspect, a session establishment system is provided, where the session establishment system includes a control device and a database entity. The control device is configured to obtain information about a group, where the information about the group includes terminal information in the group and group identification information of the group. The control device is further configured to send a trigger message to a terminal in the group based on the information about the group, where the trigger message is used to trigger the terminal in the group to initiate a session establishment procedure. The control device is further configured to send the group identification information and the terminal information in the group to the database entity. The database entity is configured to receive the group identification information and the terminal information in the group from the control device, where the group identification information is used to establish a session for the terminal in the group. For technical effects brought by the twenty-fourth aspect, refer to the technical effect brought by the fourth aspect. Details are not described herein again.

These aspects or other aspects in this application may be more comprehensible in descriptions in the following embodiments.

DESCRIPTION OF EXAMPLE EMBODIMENTS

Figure 1:
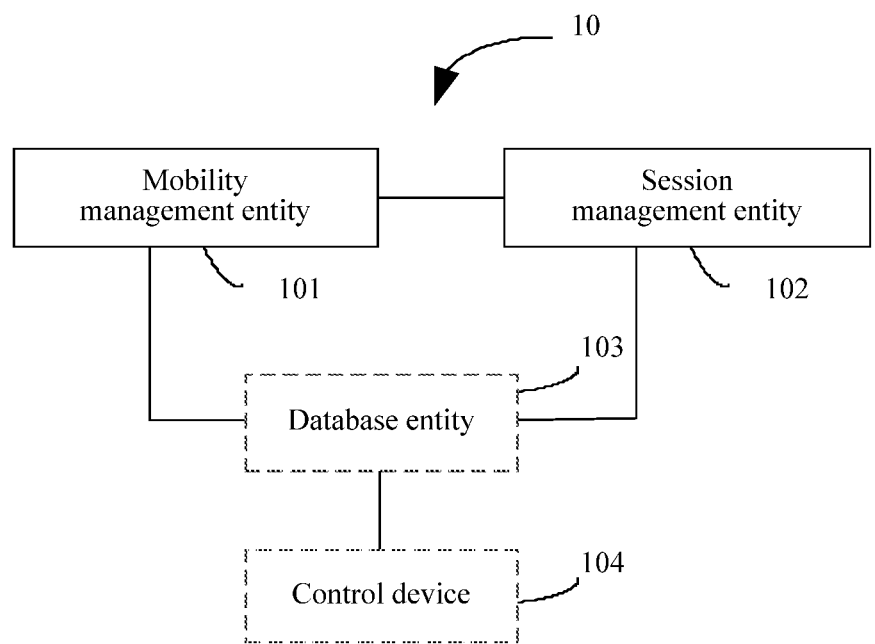
FIG. 1 is a schematic architectural diagram of a session establishment system according to an embodiment of this application.

To help understand the technical solutions provided in the embodiments of this application, brief descriptions of related technologies of this application are first provided as follows.

1. Tunnel:

Tunnels, in certain embodiments of this application, may include a next generation (N) interface 3 (N3 for short) tunnel and an N interface 9 (N9 for short) tunnel. The N3 tunnel is a tunnel between an access device (for example, a base station) and a UPF entity. The N9 tunnel is a tunnel between UPF entities. Generally, the N3 tunnel is a tunnel at a session granularity, and the N9 tunnel may be a tunnel at a session granularity or a tunnel at a device granularity.

The tunnel at a session granularity refers to a tunnel resource established for one session, and the tunnel is used for only one session. One tunnel at a session granularity includes only one routing rule, and only the routing rule can correspond to the tunnel to forward data. In addition, a lifecycle of the tunnel at a session granularity is a lifecycle of one session. In another words, when one session disappears or is released, the tunnel at a session granularity also needs to be released.

The tunnel at a device granularity refers to a tunnel resource established for one or more sessions, and the tunnel may be used for one or more sessions. One tunnel at a device granularity may include one or more routing rules, and the one or more routing rules each can correspond to the tunnel for forwarding data. In addition, a lifecycle of the tunnel at a device granularity is a lifecycle of a plurality of sessions corresponding to the tunnel. To be specific, assuming that the tunnel at a device granularity corresponds to M sessions, where M is a positive integer not less than 2, when the first M−1 sessions in the plurality of sessions corresponding to the tunnel disappear or are released, only a routing rule corresponding to the corresponding session is released; and the tunnel at a device granularity may be released only when an $M^{th}$ session in the plurality of sessions corresponding to the tunnel disappears or is released. In another embodiment, when the $M^{th}$ session in the plurality of sessions corresponding to the tunnel disappears or is released, the tunnel at a device granularity may alternatively be retained, so that a tunnel does not need to be re-established subsequently. This is not specifically limited in embodiments of the present disclosure.

Optionally, the session in the embodiments of this application may be, for example, a protocol data unit (PDU) session. This is not specifically limited in embodiments of the present disclosure. The following embodiments of this application are all described by using an example in which the session is a PDU session. This is generally described herein for embodiments of the present disclosure, and will not be described below again.

2. Path Information:

The path information in the embodiments of this application is used to establish a user plane path of a terminal. The path may be, for example, the foregoing tunnel. This is not specifically limited in embodiments of the present disclosure.

Optionally, the path information in the embodiments of this application may include at least one of uplink path information and downlink path information, and is used to establish a path between A and B. The uplink path information may include an endpoint address or an endpoint identifier of the path on the side of A, an address of A, and the like. The downlink path information includes an endpoint address or an endpoint identifier of the path on the side of B, an address of B, and the like. This is not specifically limited in embodiments of the present disclosure.

Optionally, the path information in the embodiments of this application may further include a routing rule or others.

The routing rule is specifically a rule for routing service data to a next-hop device. For details, refer to existing descriptions.

The following describes the technical solutions in the embodiments of this application with reference to the accompanying drawings in this application. In the present disclosure, "/" means "or" unless otherwise specified. For example, A/B may represent A or B. In the present disclosure, "and/or" describes only an association relationship for describing associated objects and represents that three relationships may exist. For example, A and/or B may represent the following three cases: Only A exists, both A and B exist, and only B exists. In addition, in the present disclosure, "a plurality of" means two or more than two unless otherwise specified. In addition, to clearly describe the technical solutions in the embodiments of this application, terms such as "first" and "second" are used in the present disclosure to distinguish between same items or similar items that have basically same functions and purposes. A person skilled in the art may understand that the terms such as "first" and "second" do not limit a quantity or an execution sequence, and that the terms such as "first" and "second" do not indicate a definite difference.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

FIG. 1 shows a session establishment system 10 according to an embodiment of this application. The session establishment system 10 includes a mobility management entity 101 and a session management entity 102.

The mobility management entity 101 is configured to: obtain group identification information of a group to which a terminal belongs; determine, based on the group identification information, the session management entity 102 that serves the group to which the terminal belongs; and send the group identification information to the session management entity 102.

The session management entity 102 is configured to: receive the group identification information from the mobility management entity 101; determine, based on the group identification information, a user plane function entity that serves the group to which the terminal belongs; and send path information to the user plane entity, where the path information is used to establish a user plane path of the terminal.

Optionally, the group in this embodiment may be a platoon. This is generally described herein for embodiments of the present disclosure, and will not be described below again.

Based on the session establishment system provided in this embodiment, the session management entity 102 may receive the group identification information from the mobility management entity, and determine, based on the group identification information, the user plane function entity that serves the group. In other words, for terminals in group communication, a network side selects a same user plane function entity for the terminals in the group based on the group identification information, so that during communication between the terminals in the group, forwarding data between different user plane function entities corresponding to the terminals is not needed. Therefore, a low-latency requirement of group communication can be met.

Optionally, as shown in FIG. 1, the session establishment system 10 provided in this embodiment may further include a database entity 103.

That the mobility management entity 101 is configured to determine, based on the group identification information, the session management entity 102 that serves the group to which the terminal belongs includes: sending a session management entity request message to the database entity 103, where the session management entity request message is used to request information about the session management entity 102 that serves the group to which the terminal belongs; and receiving a session management entity response message from the database entity 103, where the session management entity response message carries the information about the session management entity 102 that serves the group to which the terminal belongs.

Alternatively, that the mobility management entity 101 is configured to determine, based on the group identification information, the session management entity 102 that serves the group to which the terminal belongs includes: sending a session management entity request message to the database entity 103, where the session management entity request message is used to request information about the session management entity 102 that serves the group to which the terminal belongs; receiving a session management entity response message from the database entity 103, where the session management entity response message is used to indicate that there is no information about the session management entity 102 that serves the group to which the terminal belongs; and determining the session management entity 102 that serves the group to which the terminal belongs.

Alternatively, that the session management entity 102 is configured to determine, based on the group identification information, a user plane function entity that serves the group to which the terminal belongs includes: sending a user plane function entity request message to the database entity 103, where the user plane function entity request message is used to request information about the user plane function entity that serves the group to which the terminal belongs; and receiving a user plane function entity response message from the database entity 103, where the user plane function entity response message carries the information about the user plane function entity that serves the group to which the terminal belongs.

Alternatively, that the session management entity 102 is configured to determine, based on the group identification information, a user plane function entity that serves the group to which the terminal belongs includes: sending a user plane function entity request message to the database entity 103, where the user plane function entity request message is used to request information about the user plane function entity that serves the group to which the terminal belongs; receiving a user plane function entity response message from the database entity 103, where the user plane function entity response message is used to indicate that there is no information about the user plane function entity that serves the group to which the terminal belongs; and determining the user plane function entity that serves the group to which the terminal belongs.

Optionally, the information about the mobility management entity 101 in this embodiment may be an identifier of the mobility management entity, an address of the mobility management entity, or the like. This is generally described herein for embodiments of the present disclosure, and will not be described below again.

Optionally, the information about the user plane function entity in this embodiment of this application may be an identifier of the user plane function entity, an address of the user plane function entity, or the like. This is generally described herein for embodiments of the present disclosure, and will not be described below again.

Optionally, as shown in FIG. 1, the session establishment system 10 provided in this embodiment may further include a control device 104.

The control device 104 is configured to: obtain information about a group; and send a trigger message to a terminal in the group based on the information about the group, where the trigger message is used to trigger the terminal in the group to initiate a session establishment procedure, and the information about the group includes terminal information in the group. In other words, based on the session establishment system, the control device 104 may trigger the terminal in the group to initiate the session establishment procedure.

Further, the information about the group may further include the group identification information of the group. The control device 104 is further configured to send the group identification information to the database entity 103, where the group identification information is used to establish a session for the terminal in the group.

Further, the database entity 103 is configured to send the group identification information of the group to the mobility management entity 101 that serves the terminal in the group. In this way, the mobility management entity 101 that serves the terminal in the group may obtain the group identification information of the group to which the terminal belongs.

Optionally, the network elements in the session establishment system 10 shown in FIG. 1 may directly communicate with each other, or may communicate with each other through forwarding by another device. This is not specifically limited in embodiments of the present disclosure.

Figure 2:
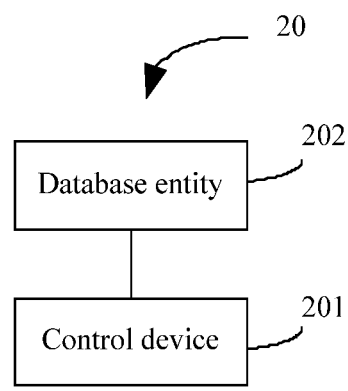
FIG. 2 is a schematic architectural diagram of a session establishment system according to an embodiment of this application.

FIG. 2 shows a session establishment system 20 according to an embodiment of this application. The session establishment system 20 includes a control device 201 and a database entity 202.

The control device 201 is configured to: obtain information about a group; and send a trigger message to a terminal in the group based on the information about the group, where the trigger message is used to trigger the terminal in the group to initiate a session establishment procedure, and the information about the group includes terminal information in the group.

The control device 201 is further configured to send the group identification information to the database entity 202, where the group identification information is used to establish a session for the terminal in the group.

The database entity 202 is configured to send the group identification information of the group to a mobility management entity that serves the terminal in the group.

Optionally, the terminal information in the group in this embodiment may be an identifier of the terminal in the group, an address of the terminal in the group, or the like. This is generally described herein for embodiments of the present disclosure, and will not be described below again.

Optionally, the network elements in the session establishment system 20 shown in FIG. 2 may directly communicate with each other, or may communicate with each other through forwarding by another device. This is not specifically limited in embodiments of the present disclosure.

Based on the session establishment system provided in this embodiment of this application, the control device may trigger the terminal in the group to initiate the session establishment procedure. In addition, the group identification information of the group to which the terminal belongs may be provided to the mobility management entity that serves the terminal in the group.

Figure 3:
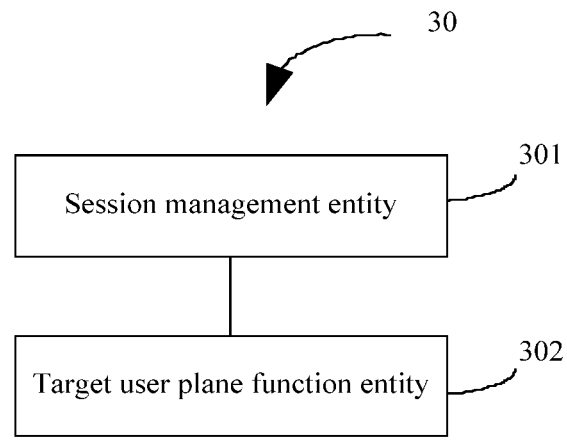
FIG. 3 is a schematic architectural diagram of a handover system according to an embodiment of this application.

Optionally, FIG. 3 shows a handover system 30 according to an embodiment of this application. The handover system 30 includes a session management entity 301 and a target user plane function entity 302.

The session management entity 301 is configured to: receive a handover request from a first access device, where the first access device is an access device currently accessed by a first terminal; and obtain, based on the handover request, terminal information in a group to which the first terminal belongs.

The session management entity 301 is further configured to: determine the target user plane function entity 302 that serves the group to which the first terminal belongs; and send path information to the target user plane function entity 302, where the path information is used to establish a user plane path of a terminal in the group to which the first terminal belongs.

Optionally, the first access device in this embodiment may alternatively be described as an access device that currently serves the first terminal or an access device corresponding to the first terminal. Similarly, in the following embodiments, a session management entity that serves a group to which a terminal belongs may alternatively be described as a session management entity corresponding to a group to which a terminal belongs or a session management entity currently accessed by a terminal in a group to which a terminal belongs. In the following embodiments, a user plane function entity that serves a group to which a terminal belongs may alternatively be described as a user plane function entity corresponding to a group to which a terminal belongs or a user plane function entity currently accessed by a terminal in a group to which a terminal belongs. In the following embodiments, a session management entity that serves a terminal may alternatively be described as a session management entity corresponding to a terminal or a session management entity currently accessed by a terminal. In the following embodiments, a user plane function entity that serves a terminal may alternatively be described as a user plane function entity corresponding to a terminal, a user plane function entity currently accessed by a terminal, or the like. This is generally described herein for embodiments of the present disclosure, and will not be described below again.

In addition, it should be noted that, in this embodiment, a session management entity that serves a group is actually a session management entity that serves a terminal in the group. A user plane function entity that serves a group is actually a user plane function entity that serves a terminal in the group. This is generally described herein for embodiments of the present disclosure, and will not be described below again.

Optionally, the network elements in the handover system 30 shown in FIG. 3 may directly communicate with each other, or may communicate with each other through forwarding by another device. This is not specifically limited in embodiments of the present disclosure.

Based on the handover system provided in this embodiment, when a terminal in the group is handed over, terminals in the group to which the terminal belongs may be migrated in batches, to ensure that all the terminals in the group are served by a same user plane function entity, and for all communications between the terminals in the group, forwarding data between different user plane function entities corresponding to the terminals is not needed. Therefore, a low-latency requirement of group communication can be met.

Optionally, the session establishment system 10 shown in FIG. 1, the session establishment system 20 shown in FIG. 2, and the handover system 30 shown in FIG. 3 may be applied to a future 5G network and another future network. This is not specifically limited in embodiments of the present disclosure.

Figure 4:
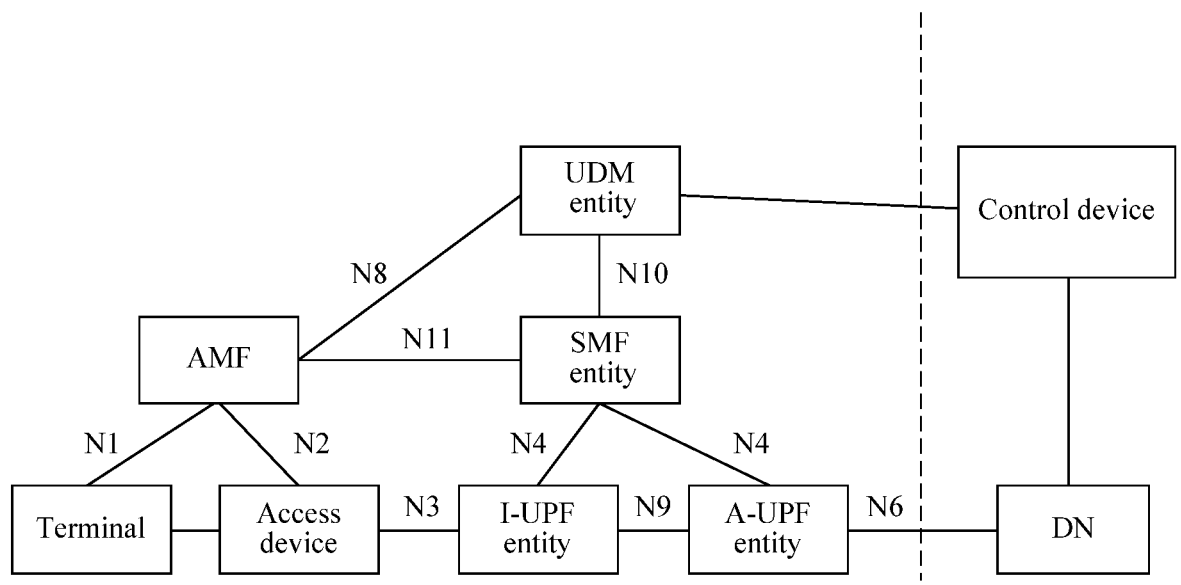
FIG. 4 is a schematic architectural diagram of a 5G network according to an embodiment of this application.

If the session establishment system 10 shown in FIG. 1, the session establishment system 20 shown in FIG. 2, and the handover system 30 shown in FIG. 3 are applied to the future 5G network, as shown in FIG. 4, a mobility management entity may be an access and mobility management function (AMF) entity in the 5G network; a session management entity may be a session management function (SMF) entity in the 5G network; a database entity may be a unified data management (UDM) entity in the 5G network; and a target user plane function entity may be a target UPF entity in the 5G network, and the target UPF entity may be an intermediate UPF (I-UPF) entity in FIG. 4.

In addition, as shown in FIG. 4, the 5G network may further include an access device and an anchor UPF (A-UPF) entity. Although not shown, the 5G network may further include an authentication server function (AUSF) entity, a policy control function (PCF) entity, or the like. This is not specifically limited in embodiments of the present disclosure.

The I-UPF entity in this embodiment is a UPF entity between the access device and the A-UPF entity. When the I-UPF entity exists, the access device is not directly connected to the A-UPF entity, but is connected to the A-UPF entity by using the I-UPF entity. The A-UPF entity is a UPF entity that is connected to the intermediate UPF entity or the access device at one end and that is connected to a DN at the other end. A mobile network implements interworking with the DN by using the A-UPF entity. For a session establishment method provided in the following embodiments of this application, the A-UPF entity always exists, and the I-UPF entity may not necessarily exist. This is generally described herein for embodiments of the present disclosure, and will not be described below again.

A terminal communicates with the AMF entity by using an N interface 1 (N1 for short). The access device communicates with the AMF entity by using an N interface 2 (N2 for short), and communicates with the I-UPF entity by using an N interface 3 (N3 for short). The I-UPF entity communicates with the A-UPF entity by using an N interface 9 (N9 for short). The AMF entity communicates with the SMF entity by using an N interface 11 (N11 for short), and communicates with the UDM entity by using an N interface 8 (N8 for short). The SMF entity communicates with the I-UPF entity or the A-UPF entity by using an N interface 4 (N4 for short). The A-UPF entity communicates with a data network (DN) in an application domain by using an N interface 6 (N6 for short).

It should be noted that names of the interfaces between the network elements in FIG. 4 are only examples, and the interfaces may have other names during specific implementation. This is not specifically limited in embodiments of the present disclosure.

It should be noted that the access device, the AMF entity, the SMF entity, the UDM entity, the I-UPF entity, the A-UPF entity, and the like in FIG. 4 are merely names, and the names constitute no limitation on the devices. In the 5G network and another further network, network elements or entities corresponding to the access device, the AMF entity, the SMF entity, the UDM entity, the I-UPF entity, and the A-UPF entity may have other names. This is not specifically limited in embodiments of the present disclosure. For example, the UDM entity may be replaced by a home subscriber server (HSS), a user subscription database (USD), a database entity, a user data management entity, or the like. This is generally described herein for embodiments of the present disclosure, and will not be described below again.

Optionally, a control device in embodiments of the application domain in FIG. 4 may be a vehicle to everything (V2X) control function (CF) entity, an application server, or the like. This is generally described herein for embodiments of the present disclosure, and will not be described below again.

Optionally, the terminal in this embodiment may include various handheld devices, vehicle-mounted devices, wearable devices, computing devices that have a wireless communications function, and/or another processing device connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (MS), a terminal device, and/or the like. For ease of description, in the present disclosure, the devices mentioned above are collectively referred to as a terminal.

Optionally, the access device in this embodiment is a device that accesses a core network, for example, a base station, a broadband network gateway (BNG), an aggregation switch, or a non-3rd generation partnership project (3GPP) access device. The base station may include base stations in various forms such as a macro base station, a micro base station (also referred to as a small cell), a relay station, and an access point.

Optionally, the mobility management entity 101, the session management entity 102, the database entity 103, and the control device 104 in FIG. 1 may be implemented by one entity device, or may be implemented by a plurality of entity devices, or may be one or more logical function modules in one entity device. This is not specifically limited in embodiments of the present disclosure.

Optionally, the database entity 202 and the control device 201 in FIG. 2 may be implemented by one entity device, or may be implemented by a plurality of entity devices, or may be one or more logical function modules in one entity device. This is not specifically limited in embodiments of the present disclosure.

Optionally, the session management entity 301 and the target user plane function entity 302 in FIG. 3 may be implemented by one entity device, or may be implemented by a plurality of entity devices, or may be one or more logical function modules in one entity device. This is not specifically limited in embodiments of the present disclosure.

Figure 5:
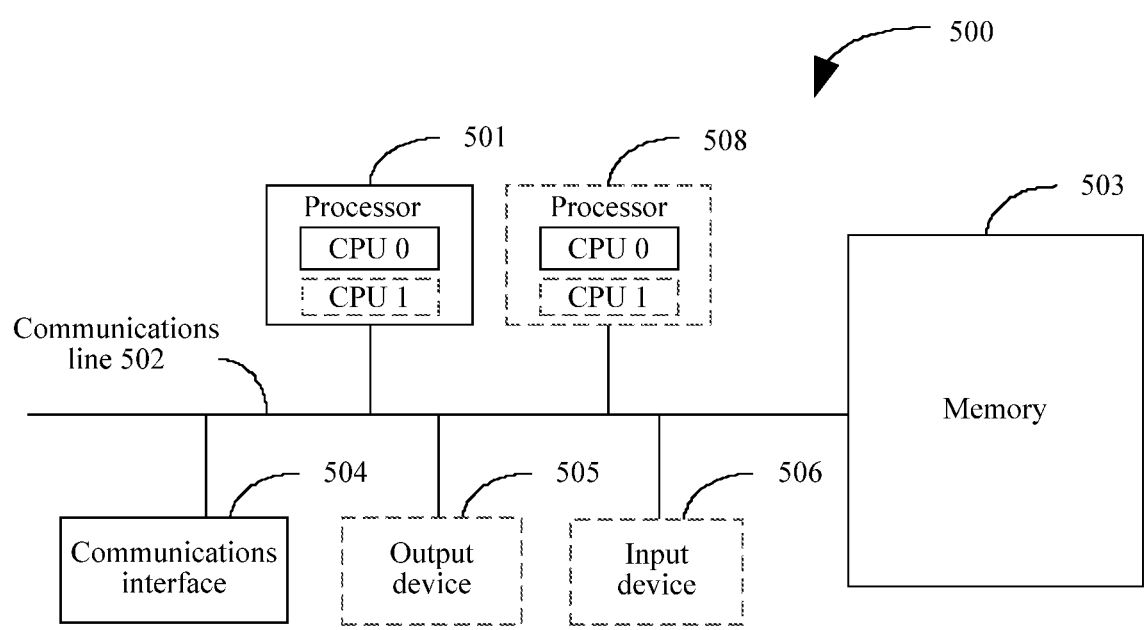
FIG. 5 is a schematic diagram of a hardware structure of a communications device according to an embodiment of this application.

For example, the mobility management entity 101, the session management entity 102, the database entity 103, or the control device 104 in FIG. 1, the database entity 202 or the control device 201 in FIG. 2, and the session management entity 301 or the target user plane function entity 302 in FIG. 3 may be implemented by using a communications device 500 in FIG. 5. FIG. 5 is a schematic diagram of a hardware structure of the communications device 500 according to an embodiment of this application. The communications device 500 includes at least one processor 501, a communications line 502, a memory 503, and at least one communications interface 504.

The processor 501 may be a general-purpose central processing unit (CPU), a microprocessor, an application-specific integrated circuit (ASIC), or one or more integrated circuits configured to control program execution of the solutions of this application.

The communications line 502 may include a path for transmitting information between the foregoing components.

The communications interface 504 uses any apparatus such as a transceiver, to communicate with another device or a communications network, such as the Ethernet, a radio access network (RAN), or a wireless local area network (WLAN).

The memory 503 may be a read-only memory (ROM), another type of static storage device that can store static information and an instruction, a random access memory (RAM), another type of dynamic storage device that can store information and an instruction, an electrically erasable programmable read-only memory (EEPROM), a compact disc read-only memory (CD-ROM), another optical disc storage, an optical disc storage (including a compact disc, a laser disc, an optical disc, a digital versatile disc, a Blu-ray disc, and the like), a disk storage medium or another magnetic storage device, or any other medium that can be used to carry or store expected program code in a form of an instruction or a data structure and that can be accessed by a computer, but is not limited thereto. The memory may exist independently, and is connected to the processor 501 by using the communications line 502. Alternatively, the memory may be integrated with the processor 501.

The memory 503 is configured to store computer-executable instructions for executing the solutions of this application, and the processor 501 controls the execution of the computer-executable instructions. The processor 501 is configured to execute the computer-executable instructions stored in the memory 503, to implement a session establishment method or a handover method provided in the following embodiments of this application.

Optionally, the computer-executable instruction in this embodiment of this application may also be referred to as application program code. This is not specifically limited in embodiments of the present disclosure.

In an embodiment, the processor 501 may include one or more CPUs, such as a CPU 0 and a CPU 1 in FIG. 5.

In another embodiment, the communications device 500 may include a plurality of processors, for example, the processor 501 and a processor 508 in FIG. 5. These processors each may be a single-core (single-CPU) processor, or may be a multi-core (multi-CPU) processor. The processor herein may be one or more devices, circuits, and/or processing cores configured to process data (for example, a computer program instruction).

In yet another embodiment, the communications device 500 may further include an output device 505 and an input device 506. The output device 505 communicates with the processor 501, and may display information in a plurality of manners. For example, the output device 505 may be a liquid crystal display (LCD), a light emitting diode (LED) display device, a cathode ray tube (CRT) display device, a projector, or the like. The input device 506 communicates with the processor 501, and may receive an input of a user in a plurality of manners. For example, the input device 506 may be a mouse, a keyboard, a touchscreen device, or a sensor device.

The communications device 500 may be a general-purpose device or a dedicated device. In certain embodiments, the communications device 500 may be a desktop computer, a portable computer, a network server, a palmtop computer (PDA), a mobile phone, a tablet computer, a wireless terminal device, an embedded device, or a device with a structure similar to the structure in FIG. 5. A type of the communications device 500 is not limited in embodiments of the present disclosure.

With reference to FIG. 1 to FIG. 5, the following specifically describes the session establishment method or the handover method provided in the embodiments of this application.

It should be noted that names of messages between network elements in the following embodiments of this application are merely examples, and may also have other names in specific implementation. For example, a notification message may also be referred to as an indication message. This is generally described herein for embodiments of the present disclosure, and will not be described below again.

Figure 6:
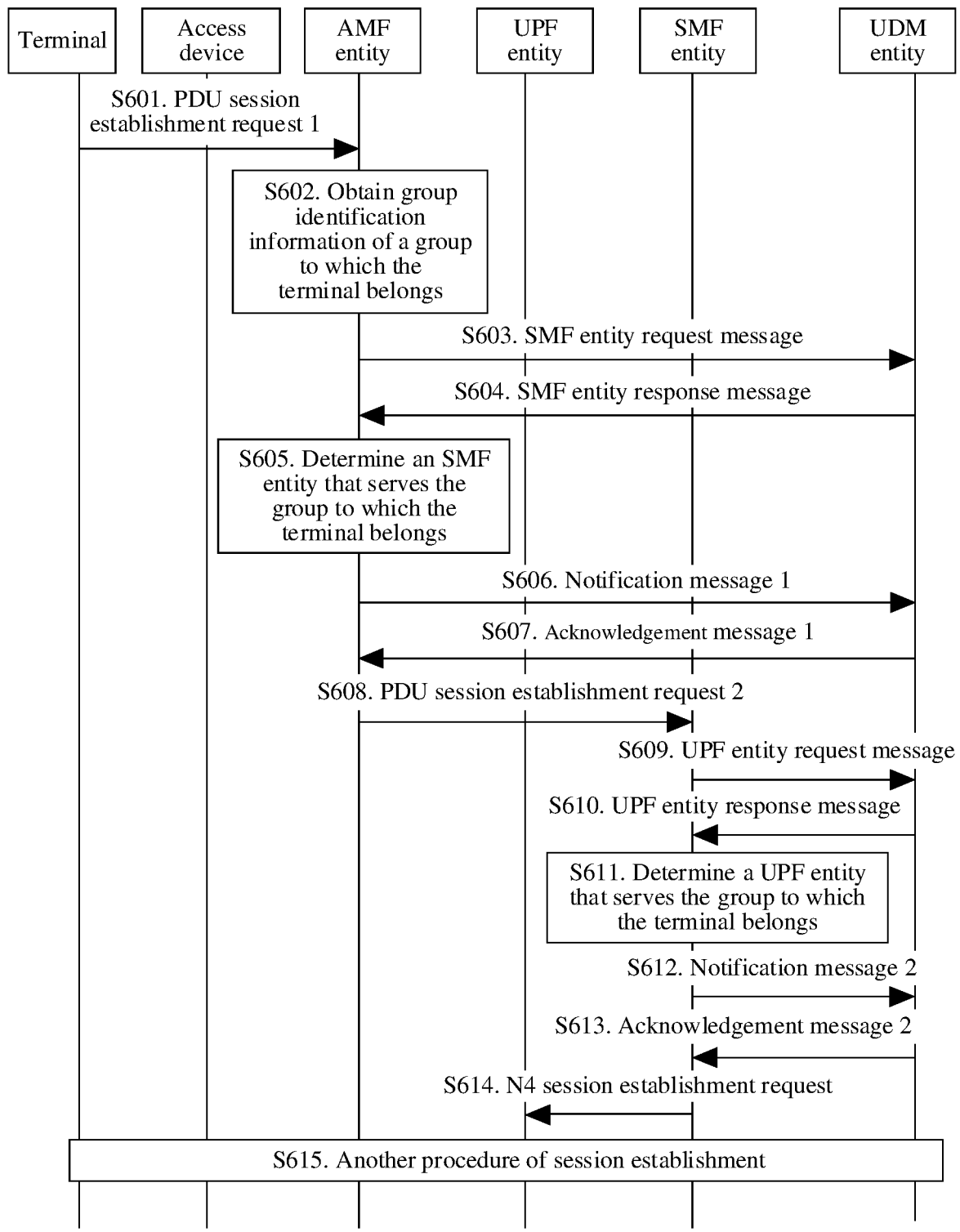
FIG. 6 is a schematic flowchart 1 of a session establishment method according to an embodiment of this application.

That the session establishment system shown in FIG. 1 is applied to the 5G network shown in FIG. 4 is used as an example. FIG. 6 shows a session establishment method according to an embodiment of this application. The session establishment method is described by using an example of establishing a session for a terminal that is the first to initiate a session establishment procedure in a group. The method includes the following steps.

S601. The terminal initiates a PDU session establishment procedure, and sends a PDU session establishment request 1 to an AMF entity, so that the AMF entity receives the PDU session establishment request 1 from the terminal.

Optionally, the PDU session establishment request 1 may carry group identification information of a group to which the terminal belongs. For a specific implementation of configuring, in the terminal, the group identification information of the group to which the terminal belongs, refer to an embodiment shown in FIG. 9. Details are not described herein.

In addition, the PDU session establishment request 1 may further carry other information. This is not specifically limited in embodiments of the present disclosure.

S602. The AMF entity obtains the group identification information of the group to which the terminal belongs.

In a possible implementation, if the PDU session establishment request 1 in step S601 carries the group identification information of the group to which the terminal belongs, after receiving the PDU session establishment request 1 from the terminal, the AMF entity may obtain the group identification information of the group to which the terminal belongs.

In a possible implementation, after receiving the PDU session establishment request 1 from the terminal, the AMF may locate a local context of the terminal based on a control plane connection identifier. The local context of the terminal may include the group identification information of the group to which the terminal belongs, so that the AMF entity may obtain the group identification information of the group to which the terminal belongs. For a specific implementation of configuring, in the AMF entity, the group identification information of the group to which the terminal belongs, refer to an embodiment shown in FIG. 8 or the embodiment shown in FIG. 9. Details are not described herein.

Optionally, in this embodiment of this application, a context of the terminal may also be referred to as the local context of the terminal. This is not specifically limited in embodiments of the present disclosure.

S603. The AMF entity sends an SMF entity request message to a UDM entity, so that the UDM entity receives the SMF entity request message from the AMF entity. The SMF entity request message is used to request information about an SMF entity that serves the group to which the terminal belongs.

Optionally, in this embodiment, the information about the SMF entity may include an address of the SMF entity, an identifier of the SMF entity, or the like. This is not specifically limited in embodiments of the present disclosure.

S604. The UDM entity sends an SMF entity response message to the AMF entity, so that the AMF entity receives the SMF entity response message from the UDM entity. The SMF entity response message is used to indicate that there is no information about the SMF entity that serves the group to which the terminal belongs.

Optionally, before step S603, the AMF entity may determine, based on the group identification information, that there is no information about the SMF entity that serves the group to which the terminal belongs in the context of the terminal, and then perform step S603. This is not specifically limited in embodiments of the present disclosure.

S605. The AMF entity determines the SMF entity that serves the group to which the terminal belongs.

The AMF entity may determine, based on a data network name (DNN), a local policy, load of the SMF entity, or the like, the SMF entity that serves the group to which the terminal belongs. For details, refer to an existing implementation of it. Details are not described herein.

Optionally, after determining the SMF entity that serves the group to which the terminal belongs, the AMF entity may store a correspondence between the information about the SMF entity and the group identification information into the context of the terminal. This is not specifically limited in embodiments of the present disclosure.

S606. The AMF entity sends a notification message 1 to the UDM entity, so that the UDM entity receives the notification message 1 from the AMF entity. The notification message 1 is used to instruct the UDM entity to store the correspondence between the group identification information and the information about the SMF entity.

Optionally, in this embodiment, a field that is used to instruct to store the correspondence between the group identification information and the information about the SMF entity may be directly defined in the notification message 1. Alternatively, the notification message 1 may be used to instruct to store the correspondence between the group identification information and the information about the SMF entity. This is not specifically limited in embodiments of the present disclosure.

Optionally, the notification message 1 may carry the group identification information and the information about the SMF entity. Alternatively, the notification message 1 may carry the information about the SMF entity, but does not carry the group identification information, and the group identification information is determined by the UDM entity after the UDM entity receives the notification message 1 from the AMF entity. This is not specifically limited in embodiments of the present disclosure.

S607. The UDM entity sends an acknowledgement message 1 to the AMF entity, so that the AMF entity receives the acknowledgement message 1 from the UDM entity. The acknowledgement message 1 is used to indicate that the UDM entity has stored the correspondence between the group identification information and the information about the SMF entity.

It should be noted that in this embodiment of this application, both steps S606 and S607 are optional steps. Steps S606 and S607 may be both performed. Alternatively, only step S606 is performed, and step S607 is not performed. Alternatively, neither of steps S606 and S607 are performed. This is not specifically limited in embodiments of the present disclosure.

S608. The AMF entity sends a PDU session establishment request 2 to the SMF entity, so that the SMF entity receives the PDU session establishment request 2 from the AMF entity. The PDU session establishment request 2 carries the group identification information.

It should be noted that in this embodiment of this application, steps S606 and S608 are not performed in a necessary sequence. Step S606 may be performed before step S608, step S608 may be performed before step S606, or steps S606 and S608 may be simultaneously performed. This is not specifically limited in embodiments of the present disclosure.

S609. The SMF entity sends a UPF entity request message to the UDM entity, so that the UDM entity receives the UPF entity request message from the SMF entity. The UPF entity request message is used to request information about a UPF entity that serves the group to which the terminal belongs.

Optionally, in this embodiment of this application, the information about the UPF entity may include an address of the UPF entity, or the like. This is not specifically limited in embodiments of the present disclosure.

Optionally, the UPF in this embodiment of this application may be the I-UPF or the A-UPF in FIG. 4. This is not specifically limited in embodiments of the present disclosure.

S610. The UDM entity sends a UPF entity response message to the SMF entity, so that the SMF entity receives the UPF entity response message from the UDM entity. The UPF entity response message is used to indicate that there is no information about the UPF entity that serves the group to which the terminal belongs.

Optionally, before step S609, the SMF entity may determine, based on the group identification information, that there is no information about the UPF entity that serves the group to which the terminal belongs in the context of the terminal, and then perform step S609. This is not specifically limited in embodiments of the present disclosure.

S611. The SMF entity determines the UPF entity that serves the group to which the terminal belongs.

The SMF entity may determine, based on a location of the terminal, load of the UPF entity, a capability of the UPF entity, or the like, the UPF entity that serves the group to which the terminal belongs. For details, refer to an existing implementation, and details are not described herein.

Optionally, after determining the UPF entity that serves the group to which the terminal belongs, the SMF entity may store a correspondence between the information about the UPF entity and the group identification information into the context of the terminal. This is not specifically limited in embodiments of the present disclosure.

S612. The SMF entity sends a notification message 2 to the UDM entity, so that the UDM entity receives the notification message 2 from the SMF entity. The notification message 2 is used to instruct the UDM entity to store the correspondence between the group identification information and the information about the UPF entity.

Optionally, in this embodiment of this application, a field that is used to instruct to store the correspondence between the group identification information and the information about the UPF entity may be directly defined in the notification message 2. Alternatively, the notification message 2 may be used to instruct to store the correspondence between the group identification information and the information about the UPF entity. This is not specifically limited in embodiments of the present disclosure.

Optionally, the notification message 2 may carry the group identification information and the information about the UPF entity. Alternatively, the notification message 2 may carry the information about the UPF entity, but does not carry the group identification information, and the group identification information is determined by the UDM entity after the UDM entity receives the notification message 2 from the SMF entity. This is not specifically limited in embodiments of the present disclosure.

Optionally, the notification message 2 in this embodiment of this application may be further used to instruct the UDM entity to store the correspondence between the group identification information and the information about the UPF entity. In this case, steps S606 and S607 may not be performed.

It should be noted that if the SMF entity stores the correspondence between the information about the UPF entity and the group identification information, steps S612 and S613 may not be performed in this embodiment of this application. This is generally described herein for embodiments of the present disclosure, and will not be described below again.

S613. The UDM entity sends an acknowledgement message 2 to the SMF entity, so that the SMF entity receives the acknowledgement message 2 from the UDM entity. The acknowledgement message 2 is used to indicate that the UDM entity has stored the correspondence between the group identification information and the information about the UPF entity.

It should be noted that in this embodiment of this application, both steps S612 and S613 are optional steps. Steps S612 and S613 may be both performed. Alternatively, only step S612 is performed, and step S613 is not performed. Alternatively, neither of steps S612 and S613 are performed. For example, in a case in which the SMF entity has stored the correspondence between the information about the UPF entity and the group identification information, neither of steps S612 and S613 are performed. This is not specifically limited in embodiments of the present disclosure.

S614. The SMF entity sends an N4 session establishment request to the UPF entity, so that the UPF entity receives the N4 session establishment request from the SMF entity. The N4 session establishment request carries path information, where the path information is used to establish a user plane path of the terminal.

With reference to the description of the path information at the beginning of DESCRIPTION OF EMBODIMENTS, the path information in step S614 may include downlink path information. Optionally, the path information may further include uplink path information. The path information is used to establish a path between an access device and the UPF entity. The downlink path information may include an endpoint address or an endpoint identifier of the path on the access device side, an address of the access device, and the like. The uplink path information may include an endpoint address or an endpoint identifier of the path on the UPF entity side, the address of the UPF entity, and the like. This is not specifically limited in embodiments of the present disclosure.

Optionally, the path information in step S614 in this embodiment of this application may further include a path rule or another. This is not specifically limited in embodiments of the present disclosure.

It should be noted that in this embodiment of this application, steps S612 and S614 are not performed in a necessary sequence. Step S612 may be performed before step S614, step S614 may be performed before step S612, or steps S612 and S614 may be simultaneously performed. This is not specifically limited in embodiments of the present disclosure.

S615. Another procedure of session establishment. For details, refer to an existing session establishment procedure, and details are not described herein.

Based on the session establishment method provided in this embodiment of this application, after the AMF entity obtains the group identification information of the group to which the terminal belongs, and determines, based on the group identification information, the SMF entity that serves the group, the UDM entity stores the correspondence between the group identification information and the SMF entity. In addition, after the SMF entity receives the group identification information from the AMF entity, and determines, based on the group identification information, the UPF entity that serves the group, the SMF entity or the UDM entity stores the correspondence between the group identification information and the UPF entity. In this way, when another terminal in the group subsequently accesses a network, the SMF entity and the UPF entity may be determined based on the group identification information. In other words, for terminals in group communication, a network side selects a same UPF entity for the terminals in the group based on the group identification information, so that during communication between the terminals in the group, forwarding data between different user plane function entities corresponding to the terminals is not needed. Therefore, a low-latency requirement of group communication can be met.

The actions of the AMF entity and the SMF entity in the foregoing steps S601 to S615 may be performed by the processor 501 in the communications device 500 shown in FIG. 5 by invoking application program code stored in the memory 503. This is not limited in embodiments of the present disclosure.

Figure 7:
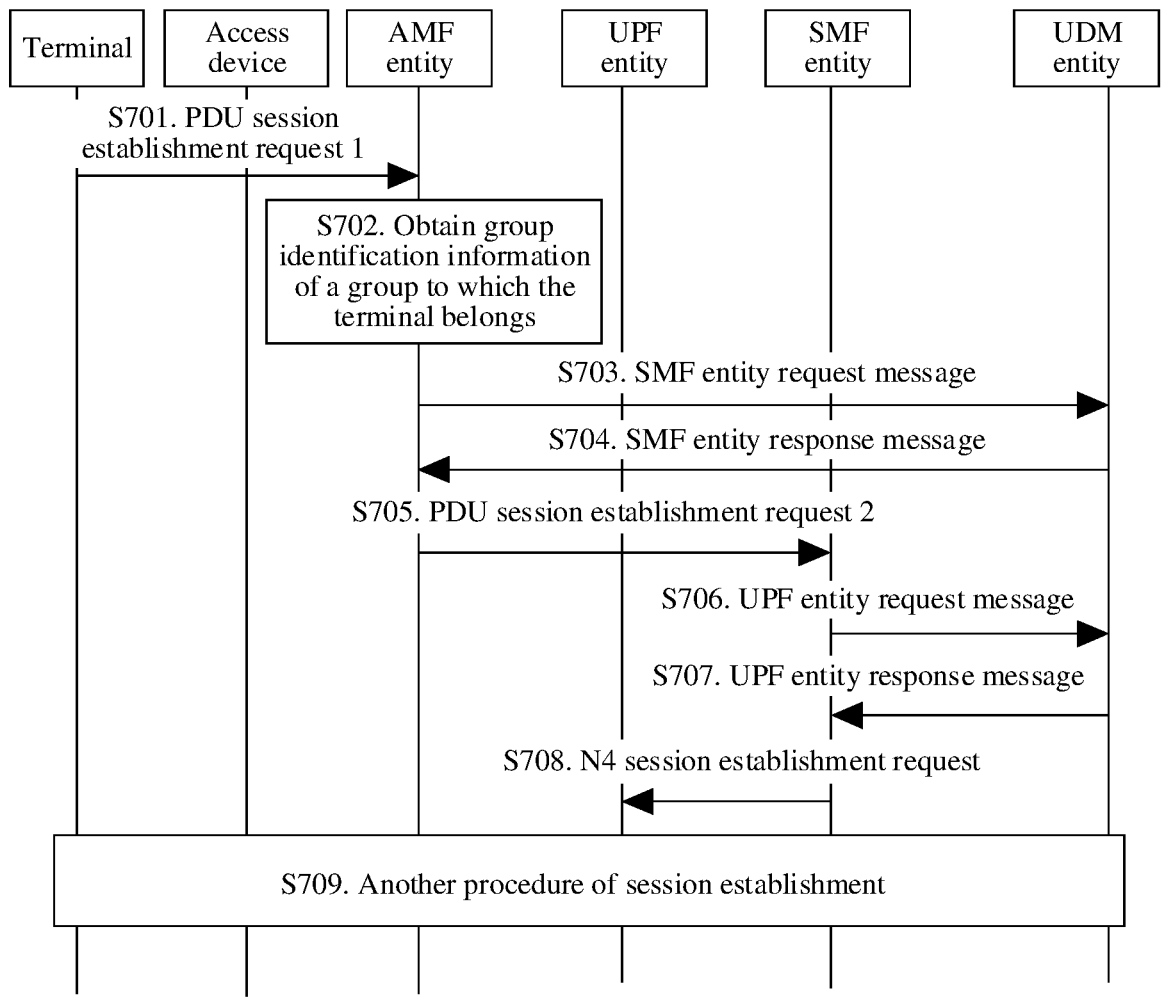
FIG. 7 is a schematic flowchart 2 of a session establishment method according to an embodiment of this application.

Optionally, that the session establishment system shown in FIG. 1 is applied to the 5G network shown in FIG. 4 is used as an example. FIG. 7 shows a session establishment method according to an embodiment of this application. The session establishment method is described by using an example of establishing a session for a terminal that is not the first to initiate a session establishment procedure in a group. The method includes the following steps.

S701 to S703. Same as steps S601 to S603. For details, refer to the embodiment shown in FIG. 6. Details are not described herein again.

S704. A UDM entity sends an SMF entity response message to an AMF entity, so that the AMF entity receives the SMF entity response message from the UDM entity. The SMF entity response message carries information about an SMF entity that serves a group to which the terminal belongs.

When a session is established for a terminal that is the first to initiate the session establishment procedure in the group, the UDM entity has stored a correspondence between group identification information and the information about the SMF entity. Therefore, when a session is established for the terminal that is not the first to initiate the session establishment procedure in the group, after receiving an SMF entity request message from the AMF entity, the UDM entity may determine, based on the correspondence, the information about the SMF entity that serves the group to which the terminal belongs, and send an SMF entity response message that carries the information about the SMF entity to the AMF entity.

Optionally, when a session is established for the terminal that is the first to initiate the session establishment procedure in the group, the AMF entity may store the correspondence between the group identification information and the information about the SMF entity. Therefore, in this embodiment of this application, before step S703 is performed, the AMF entity may determine, based on the group identification information, whether there is information about the SMF entity that serves the group to which the terminal belongs in a context of the terminal. If the information does not exist, step S703 is performed. If the information exists, the following step S705 is directly performed, instead of steps S703 and S704. This is not specifically limited in embodiments of the present disclosure.

S705 and S706. Same as steps S608 and S609. For details, refer to the embodiment shown in FIG. 6. Details are not described herein again.

S707. The UDM entity sends a UPF entity response message to the SMF entity, so that the SMF entity receives the UPF entity response message from the UDM entity. The UPF entity response message carries information about a UPF entity that serves the group to which the terminal belongs.

Steps S706 and S707 are described by using an example in which when a session is established for the terminal that is the first to initiate the session establishment procedure in the group, the UDM entity has stored the correspondence between the group identification information and the information about the UPF entity. Therefore, to establish a session for the terminal that is not the first to initiate the session establishment procedure in the group, after receiving a UPF entity request message from the SMF entity, the UDM entity may determine, based on the correspondence, the information about the UPF entity that serves the group to which the terminal belongs, and send a UPF entity response message that carries the information about the UPF entity to the SMF entity.

Optionally, when a session is established for the terminal that is the first to initiate the session establishment procedure in the group, the SMF entity may store the correspondence between the group identification information and the information about the UPF entity. Therefore, in this embodiment of this application, before step S706 is performed, the SMF entity may determine, based on the group identification information, whether there is information about the UPF entity that serves the group to which the terminal belongs in the context of the terminal. If the information does not exist, step S706 is performed. If the information exists, the following step S708 is directly performed, instead of steps S706 and S707. This is not specifically limited in embodiments of the present disclosure.

S708 and S709. Same as steps S614 and S615. For details, refer to the embodiment shown in FIG. 6. Details are not described herein again.

Based on the session establishment method provided in this embodiment of this application, the AMF entity obtains the group identification information of the group to which the terminal belongs; determines, based on the group identification information, the SMF entity that serves the group; and sends the group identification information to the SMF entity. In addition, after receiving the group identification information from the AMF entity, the SMF entity determines, based on the group identification information, the UPF entity that serves the group. In other words, for terminals in group communication, a network side selects a same UPF entity for the terminals in the group based on the group identification information, so that during communication between the terminals in the group, forwarding data between different user plane function entities corresponding to the terminals is not needed. Therefore, a low-latency requirement of group communication can be met.

The actions of the AMF entity and the SMF entity in the foregoing steps S701 to S709 may be performed by the processor 501 in the communications device 500 shown in FIG. 5 by invoking application program code stored in the memory 503. This is not limited in embodiments of the present disclosure.

The following provides two manners of configuring group identification information of a group to which a terminal belongs in the terminal or an AMF entity.

Figure 8:
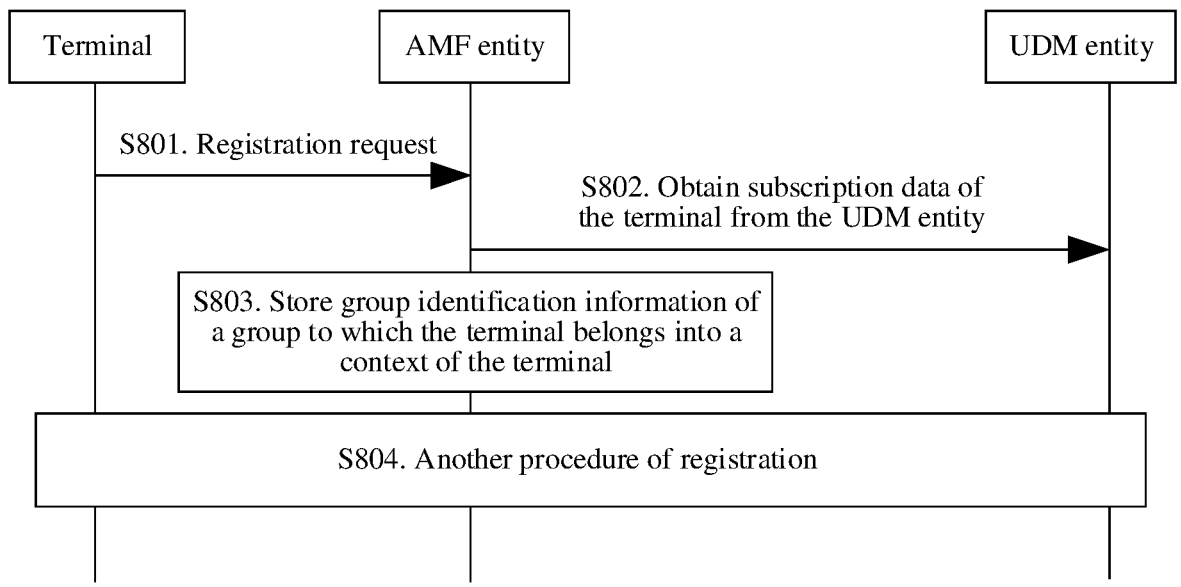
FIG. 8 is a schematic flowchart of a registration method according to an embodiment of this application.

That the session establishment system shown in FIG. 1 is applied to the 5G network shown in FIG. 4 is used as an example. As shown in FIG. 8, FIG. 8 shows a registration method according to an embodiment of this application. The registration method includes the following steps:

S801. A terminal sends a registration request to an AMF entity, so that the AMF entity receives the registration request from the terminal.

S802. The AMF entity obtains subscription data of the terminal from a UDM entity based on the registration request, where the subscription data includes group identification information of a group to which the terminal belongs.

S803. The AMF entity stores the group identification information of the group to which the terminal belongs into a context of the terminal.

S804. Another procedure of registration. For details, refer to an existing registration procedure, and details are not described herein.

Based on the registration method provided in this embodiment of this application, when the terminal statically subscribes to a network, the group identification information of the group to which the terminal belongs may be configured in the AMF entity. A PDU session may be subsequently established based on the session establishment method shown in FIG. 6, the session establishment method shown in FIG. 7, or another session establishment method.

The actions of the AMF entity in the foregoing steps S801 to S804 may be performed by the processor 501 in the communications device 500 shown in FIG. 5 by invoking application program code stored in the memory 503. This is not limited in embodiments of the present disclosure.

Figure 9:
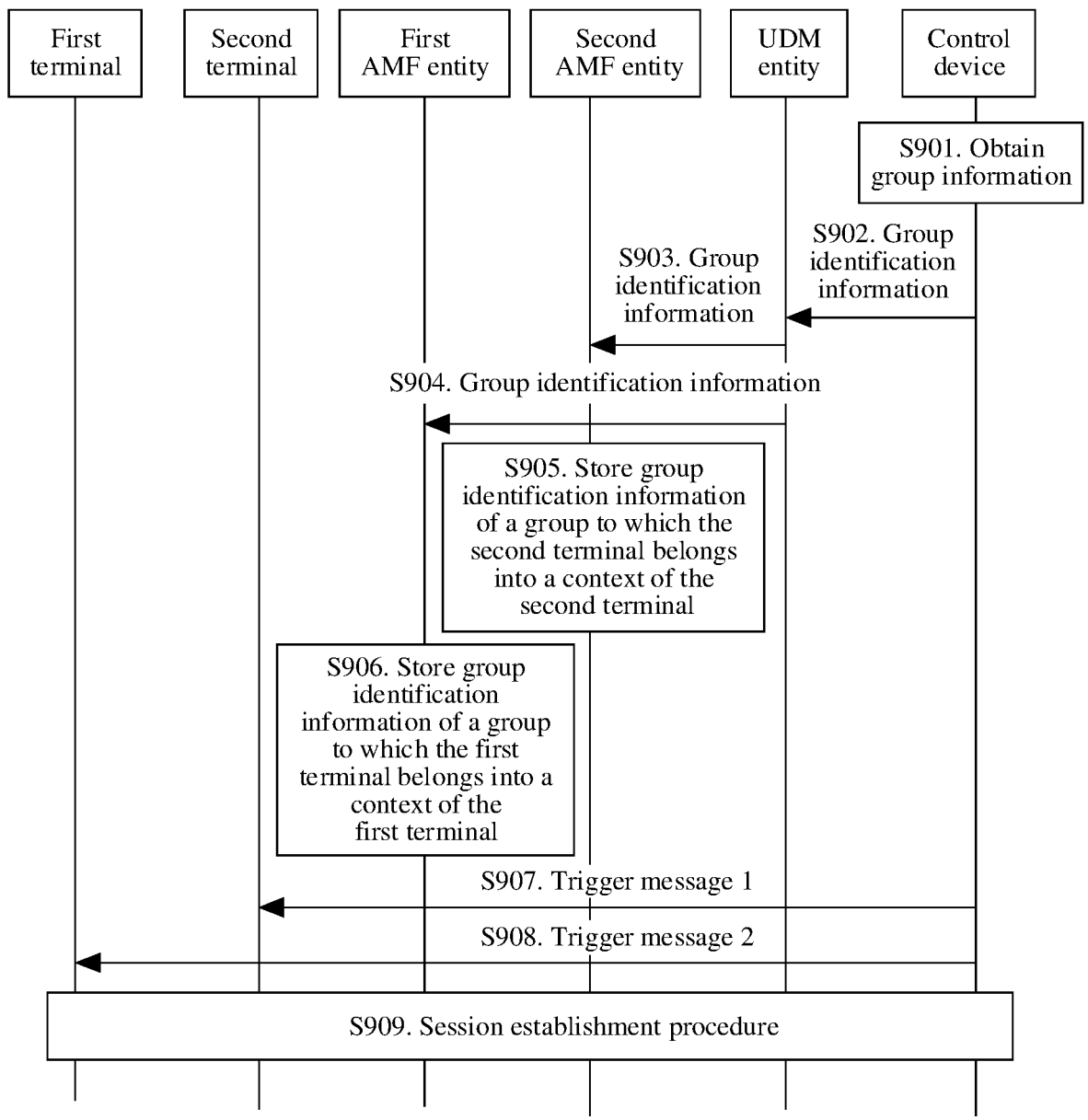
FIG. 9 is a schematic flowchart of a session establishment triggering method according to an embodiment of this application.

Optionally, that the session establishment system shown in FIG. 2 is applied to the 5G network shown in FIG. 4 is used as an example. FIG. 9 shows a session establishment method according to an embodiment of this application. The method includes the following steps.

S901. A control device obtains information about a group, where the information about the group includes terminal information in the group and group identification information.

In a possible implementation, the obtaining, by a control device, information about the group may specifically include: receiving, by the control device, a group establishment request from a first terminal or a second terminal, where the group establishment request carries the information about the group. In other words, in this implementation, the terminal triggers a group establishment procedure.

In another possible implementation, the obtaining, by a control device, information about the group may specifically include: determining, by the control device, the information about the group after determining that the group establishment procedure needs to be initiated. In other words, in this implementation, the control device triggers the group establishment procedure. For example, when determining that several terminals of a same type are quite close to each other, the control device may determine that the group establishment procedure needs to be initiated.

In still another possible implementation, the obtaining, by a control device, information about the group may specifically include: receiving, by the control device, the group establishment request from the first terminal or the second terminal, where the group establishment request carries the terminal information in the group; and determining, by the control device, the group identification information based on the terminal information in the group. This is not specifically limited in embodiments of the present disclosure.

S902. The control device sends the group identification information and the terminal information in the group to a UDM entity, where the group identification information is used to establish a session for a terminal in the group.

For example, if terminals in the group include the first terminal and the second terminal, the method further includes the following steps:

S903. The UDM entity sends the group identification information to a second AMF entity that serves the second terminal, so that the second AMF entity receives the group identification information from the UDM entity.

S904. The UDM entity sends the group identification information to a first AMF entity that serves the first terminal, so that the first AMF entity receives the group identification information from the UDM entity.

It should be noted that in this embodiment of this application, steps S903 and S904 are not performed in a necessary sequence. Step S903 may be performed before step S904, step S904 may be performed before step S903, or steps S903 and S904 may be simultaneously performed. This is not specifically limited in embodiments of the present disclosure.

Optionally, in this embodiment of this application, the first AMF entity and the second AMF entity may be the same or different. This is not specifically limited in embodiments of the present disclosure.

S905. The second AMF entity stores group identification information of a group to which the second terminal belongs into a context of the second terminal.

S906. The first AMF entity stores group identification information of a group to which the first terminal belongs into a context of the first terminal.

S907. The control device sends a trigger message 1 to the second terminal, so that the second terminal receives the trigger message 1 from the control device. The trigger message 1 is used to trigger the second terminal to initiate a session establishment procedure.

S908. The control device sends a trigger message 2 to the first terminal, so that the first terminal receives the trigger message 2 from the control device. The trigger message 2 is used to trigger the first terminal to initiate a session establishment procedure.

It should be noted that in this embodiment of this application, steps S907 and S908 are not performed in a necessary sequence. Step S907 may be performed before step S908, step S908 may be performed before step S907, or steps S907 and S908 may be simultaneously performed. This is not specifically limited in embodiments of the present disclosure.

Optionally, in this embodiment of this application, the trigger message 1 and the trigger message 2 may have other names. This is not specifically limited in embodiments of the present disclosure.

S909. Session establishment procedure.

The session establishment procedure in this embodiment of this application may be shown in FIG. 6 or FIG. 7, or may be an existing session establishment procedure or another session establishment procedure. This is not specifically limited in embodiments of the present disclosure.

Optionally, in this embodiment of this application, steps S902 to S906 or steps S903 to S906 may not be included. In this case, the trigger message 1 and the trigger message 2 need to carry the group identification information, and the first terminal and the second terminal store the group identification information. This is not specifically limited in embodiments of the present disclosure.

Based on the session establishment method provided in this embodiment of this application, the control device may trigger the terminal in the group to initiate the session establishment procedure. In addition, the group identification information of the group to which the terminal belongs may be provided to the terminal in the group or the AMF entity that serves the terminal in the group. In this way, a PDU session may be subsequently established based on the session establishment method shown in FIG. 6, the session establishment method shown in FIG. 7, or another session establishment method.

The actions of the control device and the UDM entity in the foregoing steps S901 to S909 may be performed by the processor 501 in the communications device 500 shown in FIG. 5 by invoking application program code stored in the memory 503. This is not limited in embodiments of the present disclosure.

Figure 10:
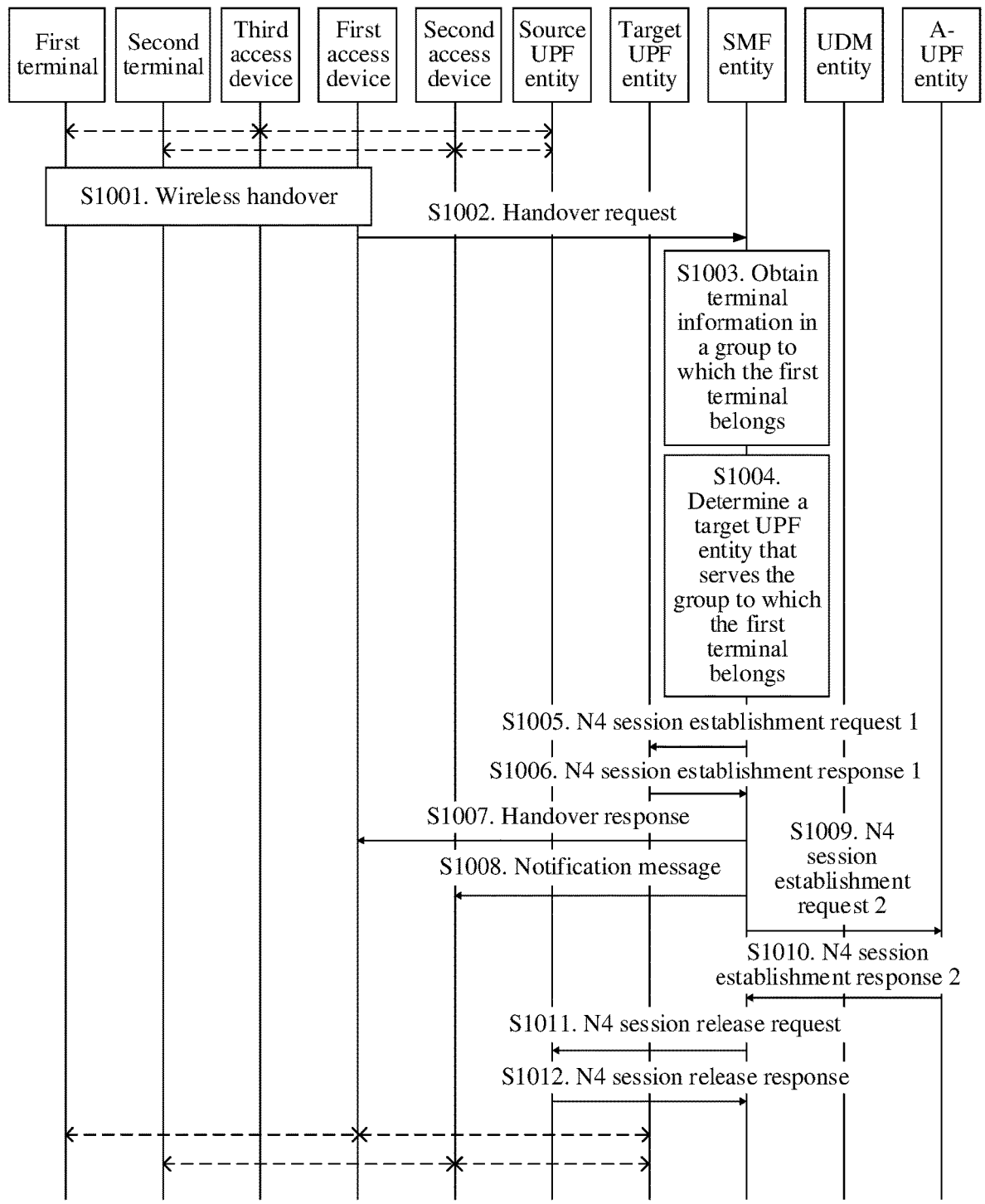
FIG. 10 is a schematic flowchart 1 of a handover method according to an embodiment of this application.

Optionally, that the handover system shown in FIG. 3 is applied to the 5G network shown in FIG. 4 is used as an example. FIG. 10 shows a handover method according to an embodiment of this application. The handover method is described by using an example in which terminals in a group include a first terminal and a second terminal, a UPF entity (namely, a source UPF entity in FIG. 10) that serves, before a handover, a group to which the first terminal belongs is an I-UPF entity, a UPF entity (namely, a target UPF entity in FIG. 10) that serves, after the handover, the group to which the first terminal belongs is an I-UPF entity, and an initial status is that the first terminal communicates with the second terminal by using the source UPF entity. Specifically, the handover method includes the following steps.

S1001. A wireless handover is performed for the first terminal, and the first terminal is handed over from a third access device to a first access device.

For a specific implementation of the wireless handover performed for the first terminal, refer to an existing implementation. Details are not described herein.

Optionally, the third access device in this embodiment of this application may also be referred to as a source access device corresponding to the first terminal, and the first access device may also be referred to as a target access device corresponding to the first terminal. This is not specifically limited in embodiments of the present disclosure.

S1002. The first access device sends a handover request to an SMF entity, so that the SMF entity receives the handover request from the first access device.

S1003. The SMF entity obtains, based on the handover request, terminal information in the group to which the first terminal belongs.

In a possible implementation, the obtaining, by the SMF entity based on the handover request, terminal information in the group to which the first terminal belongs may specifically include: obtaining, by the SMF entity, a context of the first terminal based on the handover request, where the context of the first terminal includes group identification information of the group to which the first terminal belongs; and determining, by the SMF entity based on the group identification information, the terminal information in the group to which the first terminal belongs. For example, the SMF entity may search for a context of another terminal, and determine a terminal whose context includes the group identification information of the group to which the first terminal belongs as a terminal in the group to which the first terminal belongs.

In another possible implementation, the obtaining, by the SMF entity based on the handover request, terminal information in the group to which the first terminal belongs may specifically include: determining, by the SMF entity based on the handover request, that the terminal information in the group to which the first terminal belongs needs to be obtained; sending, by the SMF entity, an obtaining request to a UDM entity, where the obtaining request is used to request to obtain the terminal information in the group to which the first terminal belongs; and receiving, by the SMF entity, the terminal information in the group to which the first terminal belongs from the UDM entity. For example, the SMF entity may obtain the context of the first terminal based on the handover request, and then the SMF entity may determine, based on the context of the first terminal and with reference to a local policy, that the terminal information in the group to which the first terminal belongs needs to be obtained. The context of the first terminal includes a terminal type or quality of service (QoS) of the first terminal, and the like. This is not specifically limited in embodiments of the present disclosure.

It should be noted that in this embodiment of this application, the SMF entity may obtain, based on the handover request, information about all terminals in the group to which the first terminal belongs, or information about some terminals in the group to which the first terminal belongs. This is not specifically limited in embodiments of the present disclosure.

S1004. The SMF entity determines a target UPF entity that serves the group to which the first terminal belongs.

The SMF entity may determine, based on information such as a location of a terminal in the group to which the first terminal belongs and load of an access device or a UPF entity corresponding to the terminal, the target UPF entity that serves the group to which the first terminal belongs. For details, refer to an existing implementation. Details are not described herein. For example, the SMF entity may preferentially select, as the target UPF entity, a light-loaded UPF entity that can cover all the terminals in the group.

Optionally, after determining the UPF entity that serves the group to which the first terminal belongs, the SMF entity may store a correspondence between information about the target UPF entity and the group identification information into the context of the terminal. This is not specifically limited in embodiments of the present disclosure.

S1005. The SMF entity sends an N4 session establishment request 1 to the target UPF entity, so that the target UPF entity receives the N4 session establishment request 1 from the SMF entity. The N4 session establishment request 1 carries path information, where the path information is used to establish a user plane path of the terminal in the group to which the first terminal belongs.

Because the handover method is described by using an example in which the terminals in the group include the first terminal and the second terminal, the path information in step S1005 may include first path information corresponding to the first terminal. Optionally, the path information may further include second path information corresponding to the second terminal. The first path information is used to establish a user plane path of the first terminal, and the second path information is used to establish a user plane path of the second terminal.

With reference to the description of the path information at the beginning of DESCRIPTION OF EMBODIMENTS, the user plane path of the first terminal in this embodiment of this application is an N3 tunnel between the first access device and the target UPF entity. The first path information may include first downlink path information. The first downlink path information may be carried in the handover request sent by the first access device to the SMF entity in step S1002. This is not specifically limited in embodiments of the present disclosure. Optionally, the first path information may further include first uplink path information. In this case, the first uplink path information is allocated by the SMF entity. Certainly, the first uplink path information may alternatively be allocated by the UPF entity. This is not specifically limited in embodiments of the present disclosure. The first uplink path information in this embodiment of this application may include an endpoint address or an endpoint identifier of the path on the target UPF entity side, an address of the target UPF entity, and the like. The first downlink path information may include an endpoint address or an endpoint identifier of the path on the first access device side, an address of the first access device, and the like. This is not specifically limited in embodiments of the present disclosure.

With reference to the description of the path information at the beginning of DESCRIPTION OF EMBODIMENTS, the user plane path of the second terminal in this embodiment of this application is an N3 tunnel between a second access device and the target UPF entity. The second path information may include at least one of second downlink path information and second uplink path information. This is not specifically limited in embodiments of the present disclosure. If the second path information includes the second downlink path information, the second downlink path information may be obtained from a local context of the terminal in the SMF entity. If the second path information includes the second uplink path information, the second uplink path information is allocated by the SMF entity. This is generally described herein for embodiments of the present disclosure, and will not be described below again. Certainly, the second uplink path information may alternatively be allocated by the UPF entity. This is not specifically limited in embodiments of the present disclosure. In this embodiment of this application, the second uplink path information may include an endpoint address or an endpoint identifier of the path on the target UPF entity side, an address of the target UPF entity, and the like. The second downlink path information may include an endpoint address or an endpoint identifier of the path on the second access device side, an address of the second access device, and the like. This is not specifically limited in embodiments of the present disclosure.

Optionally, the path information in step S1005 may further include third path information. With reference to the description of the path information at the beginning of DESCRIPTION OF EMBODIMENTS, the third path information may include at least one of third uplink path information and third downlink path information, and is used to establish an N9 tunnel between the target UPF entity and an A-UPF entity. The third downlink path information may include an endpoint address or an endpoint identifier of the path on the target UPF entity side, an address of the target UPF entity, and the like. The third uplink path information may include an endpoint address or an endpoint identifier of the path on the A-UPF entity side, an address of the A-UPF entity, and the like. This is not specifically limited in embodiments of the present disclosure.

Optionally, the path information in step S1005 may further include a routing rule or others. For details, refer to an existing implementation. This is not specifically limited in embodiments of the present disclosure.

S1006. The target UPF entity sends an N4 session establishment response 1 to the SMF entity, so that the SMF entity receives the session establishment response 1 from the target UPF entity.

S1007. The SMF entity sends a handover response to the first access device, so that the first access device receives the handover response from the SMF entity. The handover response carries the first uplink path information.

S1008. The SMF entity sends a notification message to the second access device, so that the second access device receives the notification message from the SMF entity. The notification message carries the second uplink path information.

Optionally, in this embodiment of this application, if the second path information in step S1005 does not include the second downlink path information, after step S1008, the second access device may further send the second downlink path information to the SMF entity, and after receiving the second downlink path information, the SMF entity may send the second downlink path information to the target UPF entity. This is not specifically limited in embodiments of the present disclosure.

S1009. The SMF entity sends an N4 session establishment request 2 to the A-UPF entity, so that the A-UPF entity receives the N4 session establishment request 2 from the SMF entity. The N4 session establishment request 2 carries the third downlink path information.

S1010. The A-UPF entity sends an N4 session establishment response 2 to the SMF entity, so that the SMF entity receives the session establishment response 2 from the A-UPF entity.

Optionally, in this embodiment of this application, if the third path information in step S1005 does not include the third uplink path information, the third uplink path information may be carried in the N4 session establishment response 2 in step S1010. Further, after receiving the N4 session establishment response 2, the SMF entity may send the third uplink path information to the target UPF entity. This is not specifically limited in embodiments of the present disclosure.

S1011. The SMF entity sends an N4 session release request to the source UPF entity, so that the source UPF entity receives the N4 session release request from the SMF entity.

The N4 session release request is used to request to delete, from the source UPF entity, user plane information and local routing information corresponding to the terminal in the group to which the first terminal belongs. For details, refer to an existing implementation. Details are not described herein again.

S1012. The source UPF entity sends an N4 session release response to the SMF entity, so that the SMF entity receives the N4 session release response from the source UPF entity.

It should be noted that there is no necessary sequence between steps S1005, S1007, S1008, S1009, and S1011 in this embodiment of this application. Any one of the steps may be first performed, and then the other steps are performed. Alternatively, the foregoing steps may be simultaneously performed. This is not specifically limited in embodiments of the present disclosure.

Until now, the first terminal communicates with the second terminal by using the target UPF entity.

It should be noted that, the embodiment shown in FIG. 10 is described by using an example in which there is no other I-UPF entity between the target UPF entity and the first access device or between the target UPF entity and the second access device, and there is no other I-UPF entity between the target UPF entity and the A-UPF entity. Certainly, there may be another I-UPF entity between the target UPF entity and the first access device or between the target UPF entity and the second access device, and there may be another I-UPF entity between the target UPF entity and the A-UPF entity. In this case, corresponding first path information, second path information, and third path information may be different from the first path information, the second path information, and the third path information in step S1005. This is not specifically limited in embodiments of the present disclosure.

Based on the handover method provided in this embodiment of this application, when a terminal in the group is handed over, terminals in the group to which the terminal belongs may be migrated in batches, to ensure that all the terminals in the group are served by a same UPF entity, and throughout communication between the terminals in the group, forwarding data between different user plane function entities corresponding to the terminals is not needed. Therefore, a low-latency requirement of group communication can be met.

The actions of the SMF entity in the foregoing steps S1001 to S1012 may be performed by the processor 501 in the communications device 500 shown in FIG. 5 by invoking application program code stored in the memory 503. This is not limited in embodiments of the present disclosure.

Figure 11:
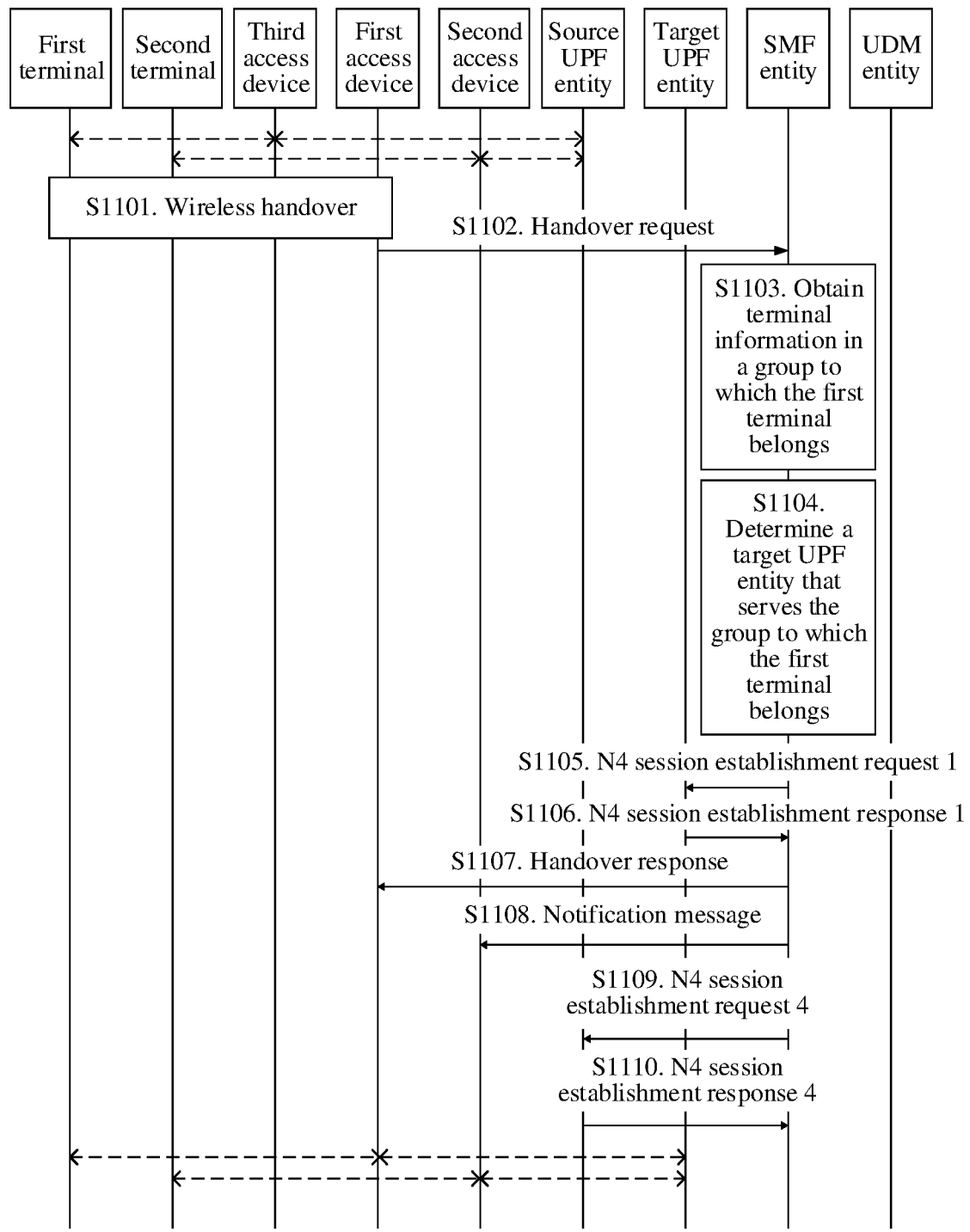
FIG. 11 is a schematic flowchart 2 of a handover method according to an embodiment of this application.

Optionally, that the handover system shown in FIG. 3 is applied to the 5G network shown in FIG. 4 is used as an example. FIG. 11 shows a handover method according to an embodiment of this application. The handover method is described by using an example in which terminals in a group include a first terminal and a second terminal, a UPF entity (namely, a source UPF entity in FIG. 11) that serves, before a handover, a group to which the first terminal belongs is an A-UPF entity, a UPF entity (namely, a target UPF entity in FIG. 11) that serves, after the handover, the group to which the first terminal belongs is an I-UPF entity, and an initial status is that the first terminal communicates with the second terminal by using the A-UPF entity. Specifically, the handover method includes the following steps.

S1101 to S1108. Same as steps S1001 to S1008. For details, refer to the embodiment shown in FIG. 10. Details are not described herein again.

S1109. An SMF entity sends an N4 session establishment request 2 to the source UPF entity, so that the source UPF entity receives the N4 session establishment request 2 from the SMF entity. The N4 session establishment request 2 carries third downlink path information.

For related descriptions of the third downlink path information, refer to the embodiment shown in FIG. 10. Details are not described herein again.

S1110. The source UPF entity sends an N4 session establishment response 4 to the SMF entity, so that the SMF entity receives the session establishment response 4 from the source UPF entity.

Optionally, in this embodiment of this application, the source UPF entity may further release local routing information. This is not specifically limited in embodiments of the present disclosure.

Until now, the first terminal communicates with the second terminal by using the target UPF entity.

In other words, in this embodiment of this application, the UPF entity that serves, before the first terminal is handed over, the group to which the first terminal belongs is the A-UPF entity. Therefore, after the first terminal is handed over, the A-UPF entity does not change, and the SMF entity inserts an I-UPF entity for the first terminal to implement the handover. In addition, in this embodiment of this application, when inserting the I-UPF entity, the SMF entity also needs to insert the I-UPF entity into a user plane path of another terminal in the group to which the first terminal belongs. In this case, a UPF entity that serves the terminal in the group to which the first terminal belongs may be a newly inserted target UPF entity, or may be the source UPF entity. According to a shortest path principle, FIG. 11 is an illustration using an example in which the first terminal communicates with the second terminal by using the target UPF entity. To be specific, after the first terminal is handed over, the source UPF entity that serves the terminal in the group to which the first terminal belongs is replaced by the target UPF entity. Certainly, the first terminal may alternatively communicate with the second terminal by using the source UPF entity. This is not specifically limited in embodiments of the present disclosure.

Based on the handover method provided in this embodiment of this application, when a terminal in the group is handed over, terminals in the group to which the terminal belongs may be migrated in batches, to ensure that all the terminals in the group are served by a same UPF entity, and throughout communication between the terminals in the group, forwarding data between different user plane function entities corresponding to the terminals is not needed. Therefore, a low-latency requirement of group communication can be met.

The actions of the SMF entity in the foregoing steps S1101 to S1110 may be performed by the processor 501 in the communications device 500 shown in FIG. 5 by invoking application program code stored in the memory 503. This is not limited in embodiments of the present disclosure.

The solutions provided in the embodiments of this application are mainly described from a perspective of interaction between network elements. It may be understood that, to implement the foregoing functions, the mobility management entity, the session management function entity, and the control device include corresponding hardware structures and/or software modules for performing the functions. A person skilled in the art should easily be aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this application.

In the embodiments of this application, division into function modules may be performed on the mobility management entity, the session management function entity, or the control device based on the foregoing example methods. For example, each function module may be obtained through division based on each corresponding function, or two or more functions may be integrated into one processing module. The integrated module may be implemented in a form of hardware, or may be implemented in a form of a software function module. It should be noted that, in this embodiment of this application, division into modules is an example, and is merely a logical function division. In actual implementation, another division manner may be used.

Figure 12:
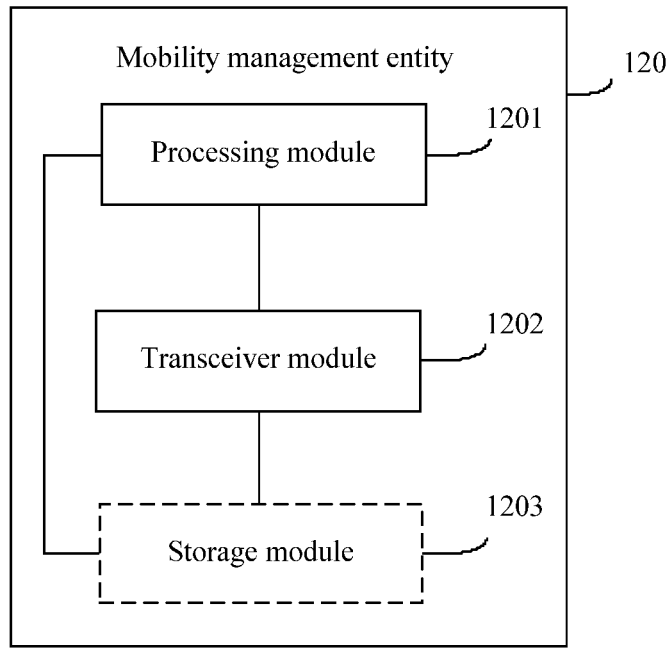
FIG. 12 is a schematic structural diagram of a mobility management entity according to an embodiment of this application.

For example, when the function modules are obtained through division performed in an integrated manner, FIG. 12 is a schematic structural diagram of a mobility management entity 120 in the foregoing embodiments. As shown in FIG. 12, the mobility management entity 120 includes a processing module 1201 and a transceiver module 1202. The processing module 1201 is configured to obtain group identification information of a group to which a terminal belongs. The processing module 1201 is further configured to determine, based on the group identification information, a session management entity that serves the group to which the terminal belongs. The transceiver module 1202 is configured to send the group identification information to the session management entity, where the group identification information is used to determine a user plane function entity that serves the group to which the terminal belongs.

Optionally, that the processing module 1201 is configured to determine, based on the group identification information, a session management entity that serves the group to which the terminal belongs includes: sending a session management entity request message to a database entity, where the session management entity request message is used to request information about the session management entity that serves the group to which the terminal belongs; and receiving a session management entity response message from the database entity, where the session management entity response message carries the information about the session management entity that serves the group to which the terminal belongs.

Alternatively, that the processing module 1201 is configured to determine, based on the group identification information, a session management entity that serves the group to which the terminal belongs includes: sending a session management entity request message to a database entity, where the session management entity request message is used to request information about the session management entity that serves the group to which the terminal belongs; receiving a session management entity response message from the database entity, where the session management entity response message is used to indicate that there is no information about the session management entity that serves the group to which the terminal belongs; and determining the session management entity that serves the group to which the terminal belongs.

Further, the transceiver module 1202 is further configured to send a notification message to the database entity, where the notification message is used to instruct the database entity to store a correspondence between the group identification information and the information about the session management entity.

Optionally, as shown in FIG. 12, the mobility management entity 120 further includes a storage module 1203. The storage module 1203 is configured to store the information about the session management entity into a context of the terminal.

Optionally, that the processing module 1201 is configured to determine, based on the group identification information, a session management entity that serves the group to which the terminal belongs includes: determining, based on the group identification information and the context of the terminal, the session management entity that serves the group to which the terminal belongs, where the context of the terminal includes the information about the session management entity that serves the group to which the terminal belongs.

Optionally, that the processing module 1201 is configured to obtain group identification information of a group to which a terminal belongs includes: obtaining the context of the terminal, where the context of the terminal includes the group identification information of the group to which the terminal belongs.

Optionally, the transceiver module 1202 is further configured to receive a registration request from the terminal, where the registration request carries an identity of the terminal. The transceiver module 1202 is further configured to obtain subscription data of the terminal from the database entity based on the identity of the terminal, where the subscription data includes the group identification information of the group to which the terminal belongs. The storage module 1203 is further configured to store the group identification information of the group to which the terminal belongs into the context of the terminal.

Optionally, the transceiver module 1202 is further configured to receive, from the database entity, the group identification information of the group to which the terminal belongs. The storage module 1203 is further configured to store the group identification information of the group to which the terminal belongs into the context of the terminal.

Optionally, that the processing module 1201 is configured to obtain group identification information of a group to which a terminal belongs includes: receiving, from the database entity, the group identification information of the group to which the terminal belongs.

Optionally, that the processing module 1201 is configured to obtain group identification information of a group to which a terminal belongs includes: receiving a session establishment request from the terminal, where the session establishment request carries the group identification information of the group to which the terminal belongs.

All related content of the steps in the foregoing method embodiments may be cited in function descriptions of corresponding function modules. Details are not described herein again.

In this embodiment, the mobility management entity 120 is presented in a form in which function modules are obtained through division in an integrated manner. The "module" herein may be an application-specific integrated circuit (ASIC), a circuit, a processor and a memory executing one or more software or firmware programs, an integrated logic circuit, and/or another device that can provide the foregoing function. In a simple embodiment, a person skilled in the art may figure out that the mobility management entity 120 may be in a form shown in FIG. 5.

For example, the processor 501 in FIG. 5 may invoke computer-executable instructions stored in the memory 503, so that the mobility management entity 120 performs the session establishment method in the foregoing method embodiments.

Specifically, functions/implementation processes of the processing module 1201, the transceiver module 1202, and the storage module 1203 in FIG. 12 may be implemented by the processor 501 in FIG. 5 by invoking the computer-executable instructions stored in the memory 503. Alternatively, a function/implementation process of the processing module 1201 in FIG. 12 may be implemented by the processor 501 in FIG. 5 by invoking the computer-executable instructions stored in the memory 503. A function/implementation process of the transceiver module 1202 in FIG. 12 may be implemented by the communications interface 504 in FIG. 5. A function/implementation process of the storage module 1203 in FIG. 12 may be implemented by the memory 503 in FIG. 5.

Because the mobility management entity 120 provided in this embodiment of this application may be configured to perform the foregoing session establishment method, for technical effects that can be obtained by the mobility management entity 120, refer to the foregoing method embodiments. Details are not described herein again.

Figure 13:
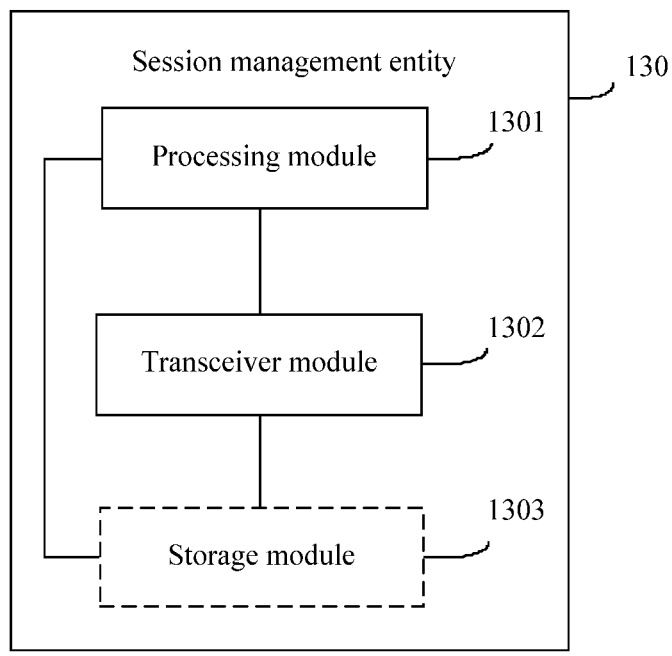
FIG. 13 is a schematic structural diagram 1 of a session management entity according to an embodiment of this application.

For example, when the function modules are obtained through division performed in an integrated manner, FIG. 13 is a schematic structural diagram of a session management entity 130 in the foregoing embodiments. As shown in FIG. 13, the session management entity 130 includes a processing module 1301 and a transceiver module 1302. The transceiver module 1302 is configured to receive group identification information of a group to which a terminal belongs from a mobility management entity. The processing module 1301 is configured to determine, based on the group identification information, a user plane function entity that serves the group to which the terminal belongs. The transceiver module 1302 is further configured to send path information to a user plane entity, where the path information is used to establish a user plane path of the terminal.

Optionally, the processing module 1301 is specifically configured to: send a user plane function entity request message to a database entity, where the user plane function entity request message is used to request information about the user plane function entity that serves the group to which the terminal belongs; and receive a user plane function entity response message from the database entity, where the user plane function entity response message carries the information about the user plane function entity that serves the group to which the terminal belongs.

Alternatively, the processing module 1301 is specifically configured to: send a user plane function entity request message to a database entity, where the user plane function entity request message is used to request information about the user plane function entity that serves the group to which the terminal belongs; receive a user plane function entity response message from the database entity, where the user plane function entity response message is used to indicate that there is no information about the user plane function entity that serves the group to which the terminal belongs; and determine the user plane function entity that serves the group to which the terminal belongs.

Optionally, the transceiver module 1302 is further configured to send a notification message to the database entity, where the notification message is used to instruct the database entity to store a correspondence between the group identification information and the information about the user plane function entity.

Optionally, as shown in FIG. 13, the session management entity 130 further includes a storage module 1303. The storage module 1303 is configured to store the information about the user plane function entity into a context of the terminal.

Optionally, the processing module 1301 is specifically configured to determine, based on the group identification information and the context of the terminal, the user plane function entity that serves the group to which the terminal belongs, where the context of the terminal includes the information about the user plane function entity that serves the group to which the terminal belongs.

All related content of the steps in the foregoing method embodiments may be cited in function descriptions of corresponding function modules. Details are not described herein again.

In this embodiment, the session management entity 130 is presented in a form in which function modules are obtained through division in an integrated manner. The "module" herein may be an ASIC, a circuit, a processor and a memory that execute one or more software programs or firmware programs, an integrated logic circuit, and/or another component that can provide the foregoing functions. In a simple embodiment, a person skilled in the art may figure out that the session management entity 130 may be in a form shown in FIG. 5.

For example, the processor 501 in FIG. 5 may invoke computer-executable instructions stored in the memory 503, so that the session management entity 130 performs the session establishment method in the foregoing method embodiments.

Specifically, functions/implementation processes of the processing module 1301, the transceiver module 1302, and the storage module 1303 in FIG. 13 may be implemented by the processor 501 in FIG. 5 by invoking the computer-executable instructions stored in the memory 503. Alternatively, a function/implementation process of the processing module 1301 in FIG. 13 may be implemented by the processor 501 in FIG. 5 by invoking the computer-executable instructions stored in the memory 503. A function/implementation process of the transceiver module 1302 in FIG. 13 may be implemented by the communications interface 504 in FIG. 5. A function/implementation process of the storage module 1303 in FIG. 13 may be implemented by the memory 503 in FIG. 5.

Because the session management entity 130 provided in this embodiment of this application may be configured to perform the foregoing session establishment method, for technical effects that can be obtained by the session management entity 130, refer to the foregoing method embodiments. Details are not described herein again.

Figure 14:
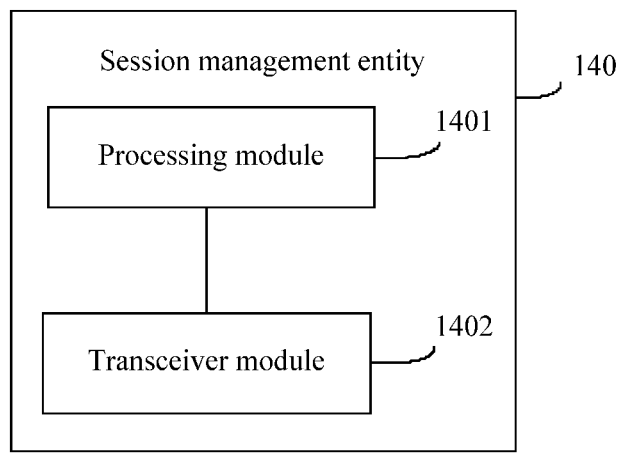
FIG. 14 is a schematic structural diagram 2 of a session management entity according to an embodiment of this application.

For example, when the function modules are obtained through division performed in an integrated manner, FIG. 14 is a schematic structural diagram of a session management entity 140 in the foregoing embodiments. As shown in FIG. 14, the session management entity 140 includes a processing module 1401 and a transceiver module 1402. The transceiver module 1402 is configured to receive a handover request from a first access device, where the first access device is an access device currently accessed by a first terminal. The processing module 1401 is configured to obtain, based on the handover request, terminal information in a group to which the first terminal belongs. The processing module 1401 is further configured to determine a target user plane function entity that serves the group to which the first terminal belongs. The transceiver module 1402 is further configured to send path information to the target user plane function entity, where the path information is used to establish a user plane path of a terminal in the group to which the first terminal belongs.

Optionally, that the processing module 1401 is configured to obtain, based on the handover request, terminal information in a group to which the first terminal belongs includes: obtaining a context of the first terminal based on the handover request, where the context of the first terminal includes group identification information of the group to which the first terminal belongs; and determining, based on the group identification information, the terminal information in the group to which the first terminal belongs.

Optionally, that the processing module 1401 obtains, based on the handover request, terminal information in a group to which the first terminal belongs includes: determining, based on the handover request, that the terminal information in the group to which the first terminal belongs needs to be obtained; sending an obtaining request to a database entity, where the obtaining request is used to request to obtain the terminal information in the group to which the first terminal belongs; and receiving the terminal information in the group to which the first terminal belongs from the database entity.

Optionally, the group to which the first terminal belongs includes a second terminal. The path information includes uplink path information of a second access device and first downlink path information of the target user plane function entity, where the uplink path information of the second access device and the first downlink path information of the target user plane function entity are used to establish a user plane path between the second access device and the target user plane function entity, and the second access device is an access device currently accessed by the second terminal. The processing module 1401 is further configured to obtain the uplink path information of the second access device.

Optionally, that the processing module 1401 is further configured to obtain the uplink path information of the second access device includes: further configured to obtain a context of the second terminal, where the context of the second terminal includes the uplink path information of the second access device. Alternatively, the processing module 1401 is further configured to receive the uplink path information of the second access device from the second access device.

Optionally, the transceiver module 1402 is further configured to send a notification message to the second access device, where the notification message is used to instruct the second access device to establish the user plane path between the second access device and the target user plane function entity.

All related content of the steps in the foregoing method embodiments may be cited in function descriptions of corresponding function modules. Details are not described herein again.

In this embodiment, the session management entity 140 is presented in a form in which function modules are obtained through division in an integrated manner. The "module" herein may be an ASIC, a circuit, a processor and a memory that execute one or more software programs or firmware programs, an integrated logic circuit, and/or another component that can provide the foregoing functions. In a simple embodiment, a person skilled in the art may figure out that the session management entity 140 may be in a form shown in FIG. 5.

For example, the processor 501 in FIG. 5 may invoke computer-executable instructions stored in the memory 503, so that the session management entity 140 performs the session establishment method in the foregoing method embodiments.

Specifically, functions/implementation processes of the processing module 1401 and the transceiver module 1402 in FIG. 14 may be implemented by the processor 501 in FIG. 5 by invoking the computer-executable instructions stored in the memory 503. Alternatively, a function/implementation process of the processing module 1401 in FIG. 14 may be implemented by the processor 501 in FIG. 5 by invoking the computer-executable instructions stored in the memory 503. A function/implementation process of the transceiver module 1402 in FIG. 14 may be implemented by the communications interface 504 in FIG. 5.

Because the session management entity 140 provided in this embodiment of this application may be configured to perform the foregoing handover method, for technical effects that can be obtained by the session management entity 140, refer to the foregoing method embodiments. Details are not described herein again.

Figure 15:
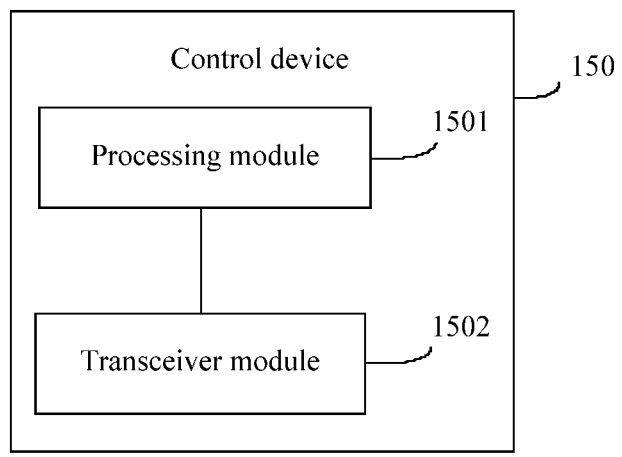
FIG. 15 is a schematic structural diagram of a control device according to an embodiment of this application.

For example, when the function modules are obtained through division performed in an integrated manner, FIG. 15 is a schematic structural diagram of a control device 150 in the foregoing embodiments. As shown in FIG. 15, the control device 150 includes a processing module 1501 and a transceiver module 1502. The processing module 1501 is configured to obtain information about a group, where the information about the group includes terminal information in a group. The transceiver module 1502 is configured to send a trigger message to a terminal in the group based on the information about the group, where the trigger message is used to trigger the terminal in the group to initiate a session establishment procedure.

Optionally, the information about the group further includes group identification information of the group. The transceiver module 1502 is further configured to send the group identification information and the terminal information in the group to a database entity, where the group identification information is used to establish a session for the terminal in the group.

All related content of the steps in the foregoing method embodiments may be cited in function descriptions of corresponding function modules. Details are not described herein again.

In this embodiment, the control device 150 is presented in a form in which function modules are obtained through division in an integrated manner. The "module" herein may be an ASIC, a circuit, a processor and a memory that execute one or more software programs or firmware programs, an integrated logic circuit, and/or another component that can provide the foregoing functions. In a simple embodiment, a person skilled in the art may figure out that the session management entity 150 may be in a form shown in FIG. 5.

For example, the processor 501 in FIG. 5 may invoke computer-executable instructions stored in the memory 503, so that the control device 150 performs the session establishment method in the foregoing method embodiments.

Specifically, functions/implementation processes of the processing module 1501 and the transceiver module 1502 in FIG. 15 may be implemented by the processor 501 in FIG. 5 by invoking the computer-executable instructions stored in the memory 503. Alternatively, a function/implementation process of the processing module 1501 in FIG. 15 may be implemented by the processor 501 in FIG. 5 by invoking the computer-executable instructions stored in the memory 503.

A function/implementation process of the transceiver module 1502 in FIG. 15 may be implemented by the communications interface 504 in FIG. 5.

Because the control device 150 provided in this embodiment of this application may be configured to perform the foregoing session establishment method, for technical effects that can be obtained by the control device 150, refer to the foregoing method embodiments. Details are not described herein again.

In the foregoing embodiment, the mobility management entity 120, the session management entity 130, the session management entity 140, or the control device 150 is presented in a form in which function modules are obtained through division in an integrated manner. Certainly, in this embodiment of this application, the function modules of the mobility management entity, the session management function entity, or the control device may be obtained through division based on the functions. This is not specifically limited in embodiments of the present disclosure.

Optionally, an embodiment of this application provides a chip system. The chip system includes a processor, configured to support a mobility management entity in implementing the foregoing session establishment method, for example, obtaining group identification information of a group to which a terminal belongs. In a possible implementation, the chip system further includes a memory. The memory is configured to store program instructions and data that are necessary for the mobility management entity. The chip system may include a chip, or may include a chip and another discrete device. This is not specifically limited in embodiments of the present disclosure.

Optionally, an embodiment of this application provides a chip system. The chip system includes a processor, configured to support a session management entity in implementing the foregoing session establishment method, for example, determining, based on group identification information, a user plane function entity that serves a group to which a terminal belongs. In a possible implementation, the chip system further includes a memory. The memory is configured to store program instructions and data that are necessary for the session management entity. The chip system may include a chip, or may include a chip and another discrete device. This is not specifically limited in embodiments of the present disclosure.

Optionally, an embodiment of this application provides a chip system. The chip system includes a processor, configured to support a session management entity in implementing the foregoing handover method, for example, obtaining, based on a handover request, terminal information of a group to which a first terminal belongs. In a possible implementation, the chip system further includes a memory. The memory is configured to store program instructions and data that are necessary for the session management entity. The chip system may include a chip, or may include a chip and another discrete device. This is not specifically limited in embodiments of the present disclosure.

Optionally, an embodiment of this application provides a chip system. The chip system includes a processor, configured to support a control device in implementing the foregoing session establishment method, for example, obtaining information about a group. In a possible implementation, the chip system further includes a memory. The memory is configured to store program instructions and data that are necessary for the control device. The chip system may include a chip, or may include a chip and another discrete device. This is not specifically limited in embodiments of the present disclosure.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, certainly, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Certainly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
   obtaining, by a mobility management entity, group identification information of a group to which a first terminal belongs, wherein the group includes a plurality of terminals;
   determining, by the mobility management entity based on the group identification information and a correspondence between the group identification information and information about a session management entity, the session management entity that serves the group; and sending, by the mobility management entity, the group identification information to the session management entity;

wherein the method further comprises:

when a session is established for a second terminal in the plurality of terminals of the group, storing, by the mobility management entity, the correspondence.

2. The method according to claim 1, wherein the second terminal is the first to initiate a session establishment procedure in the group among the plurality of terminals.

3. A communication method, comprising:

obtaining, by a mobility management entity, group identification information of a group to which a first terminal belongs, wherein the group includes a plurality of terminals;

determining, by the mobility management entity based on the group identification information and a correspondence between the group identification information and information about a session management entity, the session management entity that serves the group;

sending, by the mobility management entity, the group identification information to the session management entity; and receiving, by the session management entity, the group identification information;

wherein the method further comprises:

when a session is established for a second terminal in the plurality of terminals of the group, storing, by the mobility management entity, the correspondence.

4. The method according to claim 3, wherein the second terminal is the first to initiate a session establishment procedure in the group among the plurality of terminals.

5. A communication apparatus, comprising:

at least one processor; and a memory coupled to the at least one processor and configured to store executable instructions that, when executed by the at least one processor, instruct the at least one processor to:

obtain group identification information of a group to which a first terminal belongs, wherein the group includes a plurality of terminals;

determine, based on the group identification information and a correspondence between the group identification information and information about a session management entity, the session management entity that serves the group;

send the group identification information to the session management entity; and when a session is established for a second terminal in the plurality of terminals of the group, store the correspondence.

6. The apparatus according to claim 5, wherein the second terminal is the first to initiate a session establishment procedure in the group among the plurality of terminals.

7. A communication system, comprising a mobility management entity and a session management entity, wherein the mobility management entity is configured to:

obtain group identification information of a group to which a first terminal belongs, wherein the group includes a plurality of terminals;

determine, based on the group identification information and a correspondence between the group identification information and information about the session management entity, the session management entity that serves the group;

send the group identification information to the session management entity; and when a session is established for a second terminal in the plurality of terminals of the group, store the correspondence;

wherein the session management entity is configured to: receive the group identification information.

8. The system according to claim 7, wherein the second terminal is the first to initiate a session establishment procedure in the group among the plurality of terminals.

* * * * *